(12) United States Patent  
Srinivas et al.

(10) Patent No.: US 8,758,718 B2  
(45) Date of Patent: Jun. 24, 2014

(54) LOW TEMPERATURE SULPHUR DIOXIDE OXIDATION CATALYST FOR SULFURIC ACID MANUFACTURE

(75) Inventors: Girish Srinivas, Broomfield, CO (US); Steven C. Gebhard, Golden, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 13/882,480

(22) PCT Filed: Oct. 29, 2010

(86) PCT No.: PCT/US2010/054783  
§ 371 (c)(1), (2), (4) Date: Aug. 30, 2013

(87) PCT Pub. No.: WO2012/057794  
PCT Pub. Date: May 3, 2012

(65) Prior Publication Data  
US 2013/0336876 A1  Dec. 19, 2013

(51) Int. Cl.  
*C01B 17/64* (2006.01)  
*C01B 17/74* (2006.01)  
*B01J 23/04* (2006.01)  
*B01J 23/22* (2006.01)  
*B01J 23/52* (2006.01)

(52) U.S. Cl.  
USPC ........... 423/522; 423/533; 423/535; 502/302; 502/344; 502/354

(58) Field of Classification Search  
USPC ........... 423/522, 533, 535; 502/302, 344, 354  
See application file for complete search history.

(56) References Cited

U.S. PATENT DOCUMENTS 1,900,383 A * 3/1933 Jaeger .......................... 423/534

* cited by examiner

*Primary Examiner* — Timothy Vanoy  
(74) *Attorney, Agent, or Firm* — Lathrop & Gage LLP

(57) ABSTRACT

Improved catalysts for oxidation of sulfur dioxide which are alkali metal-promoted vanadium catalysts which are further promoted by gold. Improved methods employing such catalyst for oxidation of sulfur dioxide and for manufacture of sulfuric acid. Improved methods for multiple step oxidation of sulfur dioxide in which the last oxidation step is carried out employing improved catalysts of this invention at temperatures lower than 400° C.

20 Claims, 13 Drawing Sheets

LOW TEMPERATURE SULPHUR DIOXIDE OXIDATION CATALYST FOR SULFURIC ACID MANUFACTURE

BACKGROUND OF THE INVENTION

Sulfuric acid ($H_2SO_4$) is the largest volume industrial chemical with approximately 176 million tons made worldwide in 2006. Most sulfuric acid is used to make phosphoric acid from phosphate rock, which in turn is used in fertilizer manufacturing. Additional applications are as a catalyst for alkylation in petroleum refining, chemical manufacturing, textile fiber processing, explosives manufacture, pulp and paper processing, inorganic pigments, detergents, ore leaching and metal pickling. (Müller, T. L. (2006) "Sulfuric Acid and Sulfur Trioxide," in *Kirk-Othmer Encyclopedia of Chemical Technology*, John Wiley and Sons.)

Essentially all $H_2SO_4$ is now made by the contact process where sulfur dioxide ($SO_2$) is oxidized to sulfur trioxide ($SO_3$) using heterogeneous alkali-promoted vanadium oxide catalysts. The $SO_3$ is then reacted with water to form $H_2SO_4$.

The oxidation reaction of sulfur dioxide:

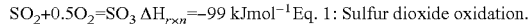

$$SO_2 + 0.5 O_2 = SO_3 \quad \Delta H_{rxn} = -99 \text{ kJmol}^{-1} \text{Eq. 1: Sulfur dioxide oxidation.}$$

is very exothermic, equilibrium limited, and exhibits a decrease in conversion with increasing temperature. To compensate for the equilibrium limitation, the sulfuric acid industry has employed a number of solutions: 1) increase the $SO_2$ concentration in the feed, 2) increase the $O_2$ concentration in the feed, 3) increase the number of catalyst beds with intermediate removal of $SO_3$, 4) decrease the operating temperature of the catalyst beds, and 5) increase the pressure (Müller, T. L. (2006) "Sulfuric Acid and Sulfur Trioxide," in *Kirk-Othmer Encyclopedia of Chemical Technology*, John Wiley and Sons). Virtually all sulfuric acid plants in operation today use multiple catalyst beds with heat removal and/or $SO_3$ removal between the beds to drive the equilibrium toward $SO_3$, see, for example FIG. 1 and FIG. 2. The need for higher conversion is not only driven by product cost, but also by limits on the amount of unconverted $SO_2$ that can be released to the atmosphere. To meet current economic and $SO_2$ tail gas emissions requirements, modern $H_2SO_4$ plants must limit their $SO_2$ emissions to no more than 4 lb of $SO_2$ per ton of sulfuric acid manufactured, which translates to 99.7% conversion. Most modern plants are designed to achieve lower $SO_2$ emissions.

During the early years of the contact process, supported platinum (Pt) was used for oxidizing $SO_2$ to $SO_3$. The Pt-based catalysts had excellent activity, but were very sensitive to poisoning, especially from arsenic (As). Arsenic is especially problematic when roasting sulfide ores because of the presence of various minerals such as arsenopyrite (FeAsS). Because of the sensitivity of Pt toward As and other poisons, new catalysts based on vanadium pentoxide ($V_2O_5$) were developed (Twigg, M. V. (ed) (1989) Section 10.4 "Sulphur Dioxide Oxidation," in *Catalyst Handbook*, 2$^{nd}$ ed., Manson Publishing). Current commercial $SO_2$ oxidation catalysts are based on alkali metal promoted vanadium oxide ($V_2O_5$), particularly those promoted with cesium (Cs), potassium (K) and mixtures of alkali metals, supported for example on silica ($SiO_2$) in various forms.

Existing commercial $SO_2$ oxidation catalysts need to be operated near 400° C. to obtain acceptable reaction rates, which in view of the reversibility of the oxidation, limits the conversion that can be realized. To compensate for this, sulfur dioxide is currently oxidized to sulfur trioxide in a catalytic reactor (such as shown in FIG. 2) that contains multiple separate catalysts beds which are operated adiabatically, and where the inlet feed gas temperature is lower in each successive bed. Typically three (older plants), four, and sometimes five beds are used to further minimize $SO_2$ emissions. In all of these $SO_2$ converters intermediate gas cooling is used between the beds, so that the reaction temperature decreases in each successive catalyst bed. The last bed is operated at the lowest possible catalyst temperature that still gives acceptable reaction rates in order to maximize $SO_2$ conversion. Even with the best current catalysts, however, reaction rates are not high enough at temperatures below 400° C. to meet increasingly stringent $SO_2$ emissions regulations. As a result, current $H_2SO_4$ manufacturers operate the final catalyst bed at temperatures near or in some cases higher than 400° C. and simply scrub out unreacted $SO_2$ from the plant's tail gas. Several patents specifically address these issues.

U.S. Pat. No. 3,259,459 relates to a process for production of $SO_3$ in which $SO_2$ is partially converted to $SO_3$ in a first pass, $SO_3$ is absorbed through an interpass absorption step and remaining $SO_2$, from which $SO_3$ is removed, is then passed into a subsequent catalyst bed at a temperature that is at least 20° C. lower than the preceding pass. A three stage process is specifically reported.

U.S. Pat. No. 3,963,423 relates to a high gas through-put process for the conversion of $SO_2$ to $SO_3$ in which the reactor includes a plurality of reaction chambers each having catalyst trays connected in parallel in the gas flow path.

There are also reports of methods and apparatus for oxidation of $SO_2$ to $SO_3$ where the feed composition or other process variables were changed to improve sulfuric acid output or economics. For example, U.S. 2003/0231998 reports methods and apparatus for oxidizing $SO_2$ to $SO_3$ where feed stream compositions are varied to improve the process. The published application provides descriptions of sulfuric acid contact plants and is incorporated by reference herein in its entirety for such description. U.S. 2007/0260072 relates to a process for $SO_2$ oxidation to $SO_3$ in which vaporized sulfur is provided in the gas stream containing $SO_2$, $SO_3$ and oxygen to enhance $SO_3$ production. U.S. Pat. No. 7,361,326 relates to a process for production of sulfuric acid in which a strong feed (concentrated) gas containing 6 vol % to 30 vol % $SO_2$ is used, which results in the final wet condensing stage having an acid dew point below 260° C. U.S. Pat. No. 7,704,476 relates to a process and plant for sulfuric acid production from $SO_2$ in which the feed to the first contact stage contains more than 16 vol % $SO_2$ with a volumetric ratio of sulfur dioxide to oxygen of more than 2.67:1. The process is reported to decrease the amount of gas that is passed through the reactor and to shift the thermodynamic equilibrium toward $SO_3$. The contact gas can be supplied at pressures of 1-30 bar (preferably 3 to 12 bar). In all cases standard commercial catalysts (alkali-promoted vanadia) were either used, or the catalyst was not specified.

U.S. Pat. Nos. 1,941,426; 3,789,019; 3,987,153; 4,193,894; 4,431,573; 4,539,309; 4,680,281, and 4,766,104, all relate to vanadium-based catalysts for oxidation of $SO_2$ to $SO_3$. U.S. Pat. No. 1,941,426 relates to a method of making $SO_3$ by oxidation of $SO_2$ employing a cesium-promoted vanadium catalyst which may be supported on diatomaceous earth or silica. Conversion is reported to be improved in the cesium-promoted catalysts compared to the base vanadium catalyst particularly at temperatures between 450° C. and 375° C.

U.S. Pat. No. 3,789,019 relates to catalysts for oxidation of $SO_2$ where the primary catalytic material is $CsVO_3$ or $RbVO_3$, a promoter, such as a metal sulfate, e.g., chromium potassium sulfate, and a carrier, e.g., refractory oxides, diatomaceous earth and/or colloidal silica. The catalyst is also reported to preferably include an activator selected from sulfates of cobalt, nickel or iron. In one example, a slurry of catalytically active components and carrier is dried, calcined and crushed to form 6-10 mesh granules. In another example, the slurry is dried to a paste and extruded into cylindrical granules which are optionally crushed to 6-10 mesh granules. In another example, a thick paste is formed by kneading catalytically active components and carrier after which the paste is dried, calcined and crushed.

U.S. Pat. No. 3,987,153 relates to a process for making sulfuric acid and reducing $SO_2$ content in the off-gases of the process by scrubbing the off-gases with aqueous hydrogen peroxide ($H_2O_2$) and/or sulfur-containing peroxy acids. The patent refers to a multistage oxidation catalyst to convert $SO_2$ to $SO_3$, absorption of $SO_3$ in water to form $H_2SO_4$ and the scrubbing process. The final oxidation stage of the process is reported to employ a supported $CsVO_3$ or $RbVO_3$ catalyst activated with cobalt or nickel sulfate and promoted with alkali metal sulfates, potassium aluminum sulfate or chromium potassium sulfate. Performance reported is at temperatures of 450° C. or higher.

U.S. Pat. No. 4,193,894 relates to a catalyst for oxidation of sulfur dioxide at temperatures above 300° C. which is a melt at reaction conditions and which includes sulfatized vanadium ions and two different promoters dispersed in an inert porous carrier. The promoters are reported to be (1) cesium ions optionally in combination with ions of another alkali metal and (2) ions of a metal which does not promote formation of inactive $V^4$ species and the oxide of which has a heat of formation greater than 100 kcal/gram atom of oxygen and is at least partly soluble in the melt, such as aluminum, magnesium, yttrium or lanthanum. Pellets of catalytic material are reported to be formed by impregnating a porous carrier with a solution of certain active species or precipitating carrier with certain active species with carrier then being formed into pellets and dried.

U.S. Pat. No. 4,206,086 relates to the use of calcined and finely comminuted diatomaceous earth (a naturally occurring form of silica), particularly that from a certain fresh water diatom, as the support for alkali-promoted vanadium oxide. Extruded pellets of catalyst are reported to be prepared by dry mixing vanadium oxide, alkali sulfate and carrier and adding sufficient water to form a mixture for extrusion. Extruded pellets are dried, heated at 1000° C. and activated.

U.S. Pat. No. 4,431,573 relates to catalysts that contain $V_2O_5$ and alkali sulfate for oxidizing $SO_2$ to $SO_3$ in contact-catalysis systems. Reported catalysts are produced by impregnating prefabricated supports with solutions of active substances. The catalysts are reported to effect high conversion at a "low temperature." Maximum catalytic conversion reported was at temperatures above 400° C.

U.S. Pat. No. 4,539,309 relates to catalysts for oxidizing $SO_2$ to $SO_3$ having a silica-based carrier with active material containing vanadium and alkali metal compounds. A specific catalyst preparation is described in which vanadium pentoxide is dissolved in an alkali solution, the solution is acidified by addition of sulfuric acid and the acidified solution is contacted with the carrier. The resulting mixture is molded, dried and calcined. In an alternate preparation, mechanically stable catalysts are reported to be formed by dissolving alkali metal silicate and/or silica sol in the alkaline solution prior to acidification and thereafter the solution is combined with the carrier.

U.S. Pat. Nos. 4,680,281 and 4,766,104 relate to a process for producing a catalyst for oxidizing $SO_2$ to $SO_3$ in which prefabricated carrier bodies are impregnated with solutions containing vanadium and alkalis. In specific examples, vanadium pentoxide, and certain alkali sulfates are combined with sulfuric acid to form an impregnating solution which is contacted with carrier. The catalysts are reported to be activated under oxidizing conditions at a temperature of 700 to 1000° C.

U.S. Pat. Nos. 5,175,136 and 5,264,200 relate to monolithic catalysts for converting sulfur dioxide to sulfur trioxide. The reported catalysts have platinum or alkali metal-vanadium active phases.

U.S. 2003/0157010 A1 reports a process for oxidizing $SO_2$ to $SO_3$ in a gas mixture containing 15-60 vol % $SO_2$ which uses two catalyst layers. The first catalyst layer contains a commercially available vanadium pentoxide catalyst and the second catalyst layer contains a catalyst containing iron. The gas mixture is introduced into the first catalyst layer at temperatures of 350° C. to 600° C. The gas mixture is thereafter directed to the second catalyst layer with a temperature of 500° C. to 700° C. The second catalyst layer is reported to preferably contain 3 to 30 wt % arsenic oxide.

U.S. 2005/0287057 A1 reports $SO_2$ oxidation described as "efficient high-volume oxidation" with vanadium or other catalytic dopants supported on activated carbon. The use of catalyst formulations using metals that can alternate back and forth between +4 and +6 oxidation states (such as tungsten or molybdenum), are reportedly able to increase efficiency. The gas containing $SO_2$ is reported to be contacted with an activated carbon preparation containing catalytic metal dopant in a reactor that also contains an anhydrous liquid solvent. The solvent is described as a stripping agent to remove $SO_3$ from the activated carbon preparation.

The present invention relates to $SO_2$ oxidation catalysts that contain gold in the form of particles, including those that are a micron or less in size and possibly as small as a few nanometers. The following discussion relates to the various catalytic applications of gold including those in which gold is employed in nanoparticulate/nanocrystallite form.

Catalytic applications of gold are exemplified by its addition to a supported cobalt hydrodesulfurization (HDS) catalyst (Venezia A. M. et al. 2007 "Hydrodesulfurization Cobalt-based Catalysts Modified by Gold," *Gold Bull.* 40(2)130-134) and its use when alloyed with palladium as a catalyst for vinyl acetate monomer synthesis (Bond, G. C.; Louis, C. and Thompson, D. T. (2006) *Catalysis by Gold*, Imperial College Press). Other applications for gold catalysts are typically low to moderate temperature reactions that include among others CO oxidation (and CO oxidation in $H_2$ rich streams), total hydrocarbon oxidation, hydrochlorination of acetylene to make vinyl chloride, direct formation of hydrogen peroxide from $H_2$ and $O_2$, epoxidation of propylene to make propylene oxide, and the water gas shift reaction (Bond, G. C.; Louis, C. and Thompson, D. T. (2006) *Catalysis by Gold*, Imperial College Press). In the hydrodesulfurization (HDS) application, the gold is reported to be present in the catalyst as small particles (28, 37 or 60 nm). It was also reported that gold lowered the temperature required to reduce the $Co_3O_4$ (which contains a mixture of $Co^{3+}$ and $Co^{2+}$), to CoO and to metallic cobalt, and to thus keep the cobalt in a more disperse state. In vinyl acetate monomer synthesis, gold is reported to be alloyed with palladium, rather than being present in the catalyst as discrete particles. In vinyl acetate monomer synthesis, gold is reported to be alloyed with palladium, and act to isolate Pd sites and inhibit undesirable reactions (Chen, M.; Kumar, D.; Yi, C-W. and Goodman, D. W. (2005) "The Promotional Effect of Gold in Catalysis by Palladium-Gold, *Science*, 310 (5746) 291-293).

Unique catalytic properties are reported to be exhibited by gold nanoparticles supported on reducible metal oxides (Hutchings, G. J. (2005) "Catalysis by Gold," *Catalysis Today*, 100, 55-61); Haruta, M. (1997) "Novel catalysis of gold deposited on metal oxides," *Catalysis Surveys from Japan*. Vol 1(1) 61-73.) Typical examples of these catalytic properties are low-temperature catalytic combustion, low temperature CO oxidation (to form $CO_2$), partial oxidation of hydrocarbons, hydrogenation of carbon oxides and unsaturated hydrocarbons, and the reduction of nitrogen oxides (Haruta, M., (2004). "Gold as a Novel Catalyst in the $21^{st}$ Century: Preparation, Working Mechanism and Applications" *Gold Bulletin*, 37 (1-2), 27; Haruta, M., and Sano, H. (1983). *Preparation of Catalysts III*, Elsevier Science Publishers, B.V., Amsterdam; Haruta, M., Kobayashi, T.; Iijima, S, and Delannay, F. (1988). *Proceedings of $9^{th}$ Int. Congress of Catalysis*, Calgary; Haruta, M., Kobayashi, T.; Sano, H. and Yamada, N. (1987). *Chemistry Letters*, Novel Gold Catalysts for the Oxidation of Carbon Monoxide at a Temperature far Below 0° C., pp. 405-408; and Haruta, M.; Tsubota, S.; Kobayashi, T.; Kageyama, H.; Genet, M. J. and Delmon, B. (1993) "Low-Temperature Oxidation of CO over Gold Supported on $TiO_2$, $\alpha$-$Fe_2O_3$ (hematite) and $Co_3O_4$ *Journal of Catalysis*, Volume 144, 175-192).

Bulk gold is reported to be essentially inert as a catalyst, but when gold nanoparticles are supported on or mixed with reducible metal oxides (such as $Fe_2O_3$ or $TiO_2$), the resulting catalysts are reported to oxidize carbon monoxide (CO) to $CO_2$ at temperatures well below 0° C. Extensive research on the use of nanoparticulate/nanocrystallite gold (Au), indicates that Au imparts its unique low-temperature catalytic behavior only when it is dispersed on a support such as a metal oxide or carbon at the nanometer scale, where it no longer exhibits the electronic structure of bulk gold; larger gold particles/crystallites appear to behave like the bulk noble metal and do not enhance low temperature catalytic activity (Hutchings, 2005; Bond 1999; Bond, G. C.; Louis, C. and Thompson, D. T. (2006) *Catalysis by Gold*, Imperial College Press; Haruta, M., (2004). "Gold as a Novel Catalyst in the $21^{st}$ Century: Preparation, Working Mechanism and Applications," *Gold Bulletin*, 37 (1-2), 27.)

U.S. Pat. Nos. 4,698,324; 4,839,327; 4,937,219; 5,051,394; and 5,789,337 of Haruta et al. are all related to methods of preparing gold-based catalysts. U.S. Pat. No. 4,698,324 reports an improved deposition precipitation method for depositing gold or a mixture of gold and a catalytically active metal oxide on a carrier in the presence of urea or acetamide to form a catalyst useful, for example, for efficient fuel combustion. The size of the gold particles/crystallites that were deposited is not discussed. U.S. Pat. No. 4,839,327 reports deposition methods to form "ultra-fine" gold particles on a metal oxide to generate a catalyst for reduction and oxidation, in sensor elements for flammable gases, and as an electrode catalyst. The methods reported involve (1) slow addition of an aqueous solution of a gold compound to an aqueous solution containing a metal oxide (pH 7 to 11); (2) addition of reducing agent to an aqueous solution of metal oxide and gold compound (pH 7 to 11); or (3) bubbling carbon dioxide gas into an aqueous solution of metal oxide and gold compound (pH 11 to 12) to deposit gold hydroxide on the metal oxide. The metal oxide with deposited gold hydroxide is then heated to convert gold hydroxide to metallic gold. The method is reported to provide gold particles of uniform particle diameter not exceeding 500 Å.

U.S. Pat. No. 4,937,219 reports similar methods for deposition of "ultra-fine" gold particles on alkaline earth metal compounds. U.S. Pat. No. 5,051,394 reports an ultra-fine gold particle-immobilized oxide produced by coprecipitation from an aqueous solution containing a gold compound, a water-soluble metal salt and a carboxylic acid or carboxylate. U.S. Pat. No. 5,789,337 relates to methods for forming gold nanoparticles of dimension less than 250 Å by contacting a support with evaporated gold compound.

There are several reports of Au-promoted $V_2O_5$ catalysts in the literature, but none for $SO_2$ oxidation. For example, Au-promoted $V_2O_5/SiO_2$ and $MoO_3/SiO_2$ catalysts have been reported to be active for the oxidation of $C_3$ hydrocarbons and CO, gold was reported to make the $V_2O_5$ and $MoO_3$ catalysts more easily reduced by the hydrocarbons or CO. [Ruszel, M.; Grzybowska, B.; Gasior, M.; Samson, K.; Gressel, I. Stoch, J. (2005) "Effect of Au in $V_2O_5/SiO_2$ and $MoO_3/SiO_2$ Catalysts on Physicochemical and Catalytic Properties in Oxidation of $C_3$ Hydrocarbons and of CO," Catalysis Today, 99, 151-159.] The reference reports that the content of Au in the catalysts was 1 wt %.

In temperature-programmed reduction (TPR) experiments with hydrogen gas, Munteanu, G.; Ilieva, L.; Nedyalkova, R. and Andreeva, D. (2004) "Influence of Gold on the Reduction Behavior of Au—$V_2O_5/CeO_2$ Catalytic Systems: TPR and Kinetic Parameters of Reduction," Applied Catalysis, A: General, 277, 31-40 report that adding gold nanocrystallites (frequently referred to as nanoparticles in the literature) to $V_2O_5/CeO_2$ catalyst made the $V_2O_5$ easier to reduce. In both cases the presence of gold lowered the activation energy for the equilibrium between vanadium (V) and vanadium (IV), i.e. $V^{5+} = V^{4+} + e^-$.

Studies of benzene oxidation over Au—$V_2O_5/TiO_2$ and Au—$V_2O_5/ZrO_2$, reported that gold lowered the activation energy for benzene oxidation, presumably by enhancing oxygen chemisorption [Andreeva, D.; Tabakova, T. and Idakiev, V. (1998) "Complete Oxidation of Benzene over Au—$V_2O_5/TiO_2$ and Au—$V_2O_5/ZrO_2$ Catalysts," Gold Bulletin, 31 105-106.] The catalysts employed were prepared by deposition-precipitation of gold onto the support and impregnation with $(NH_4)_2[VO(C_2H_4)_2]$ with the atomic ratios Au:$V_2O_5$:$MO_2$ (M=Ti, Zr) reported to be 1:1.3:31.

U.S. Pat. No. 6,825,366 relates to a process for epoxidation of olefins employing a catalyst comprising gold, preferably in nanometer size on a support material, where the support material contains one or more elements chosen from scandium, hafnium, vanadium, niobium, tantalum, chromium, molybdenum and tungsten and in which the catalyst is free of titanium. Specifically identified supports include those prepared by sol-gel synthesis employing silanol compounds, such as vanadium/tetraethylorthosilicate and which are described as vanadium silicate. It is also asserted that promoters including alkali metals can be added to the catalysts.

U.S. Pat. No. 5,567,839 relates to palladium/gold shell type catalysts for vinyl acetate production in which a barium salt is used to precipitate water-insoluble palladium and optional gold compounds onto a support prior to reduction with a reducing agent.

U.S. Pat. No. 6,468,496 relates to a supported gold-containing catalyst for producing hydrogen peroxide from direct liquid-phase reaction of hydrogen and oxygen. The patent refers to gold supported on a support such as titania, zirconia, titania-silica or zirconia-silica.

U.S. Pat. No. 6,136,281 relates to the removal of mercury from a stack gas by catalytic oxidation of elemental mercury to mercury(II)chloride ($HgCl_2$). Gold-coated particular material is employed to oxidize mercury.

JP 2002305001 relates to an electrode catalyst containing platinum and gold carried on a conductive carbon material for use in a fuel cell.

U.S. Pat. No. 6,692,713 relates to preferential oxidation of carbon monoxide and/or methanol in a hydrogen-containing process stream employing a catalyst comprising gold on a support comprising non-reducible magnesium aluminum oxide in the form of $MgAl_2O_4$ spinel.

DE 10205873 A1 (also EP1478459 A1) relates to metal-oxide supported Au catalysts reported to have a narrow cluster size distribution and a high degree of dispersion for the Au cluster. The catalysts are reported suitable for the selective CO oxidation in reformer gases, the low-temperature water-gas shift reaction (WGS), the synthesis of methanol, the epoxidation of olefins, or the total oxidation of CO, hydrocarbons or halogenated gases.

JP 6039284 (published 1994) relates to a NOx decomposition catalyst having vanadium oxide and gold or a gold compound deposited on titanium oxide. The catalyst is reported to be employed to efficiently treat NOx-containing exhaust gas containing material that is poisonous to the catalyst such as water or SOx at relatively low temperature, such as 170° C. or lower.

JP 10216518 (published 1998) relates to a gold alloy catalyst useful as an exhaust gas purification catalyst. The alloy catalyst is made up of Au and one or more of Pt, Pd, Ag, Cu and Ni.

JP 4371228 (published 1992) relates to a catalyst to remove malodorous compounds such as aldehydes and ketones by oxidation. The catalyst is a metal oxide-gold mixture in which fine gold particles are fixed on a metal oxide, such as a p-type semiconductor oxide, e.g. cobalt oxide or nickel oxide or an n-type semiconductor oxide, e.g. iron oxide or titanium oxide and which is supported on a metal oxide carrier such as alumina or silica or a metal carrier such as stainless steel or iron.

U.S. Pat. No. 6,825,366 relates to catalytic epoxidation of olefins using oxygen and hydrogen employing a catalyst comprising gold, preferably in nanometer size, on a support material comprised of scandium, yttrium, lanthanum, zirconium, hafnium, vanadium, niobium, tantalum, chromium, molybdenum and/or tungsten and is essentially free of titanium. The catalysts are prepared by first mixing an oxide or other source of scandium, yttrium, lanthanum, zirconium, hafnium, vanadium, niobium, tantalum, chromium, molybdenum and/or tungsten with tetraethylorthosilicate (TEOS) and subsequently heat-treated to form a metal silicate. The catalysts are made by treating the metal silicate with a solution containing a gold compound and citric acid, which deposits gold particles onto the surface of the metal silicate. The catalyst is then washed, dried and calcined.

U.S. 2007/0093559 relates to oxidation or reduction of organic and inorganic compounds employing a supported catalyst consisting of nickel promoted with silver or gold which is present in an amount between 0.001% and 30% by weight based on the amount of nickel in the catalyst. The application refers to $SO_2$ oxidation to $SO_3$ employing the nickel catalyst. Gold and silver are reported to block active sites on the nickel catalyst such that the nickel shows a more "noble" behavior. Gold or silver is said to either block "poisonous side reactions" giving increased activity or reduce activity of the nickel catalyst. In the example of $SO_2$ oxidation, a Au-promoted nickel catalyst sample is reported consisting of 17 wt % nickel and 0.3 wt % gold, prepared by incipient wetness of the support (spinel, $MgAl_2O_4$) using tetraammine gold (III) nitrate, $(NH_3)_4Au(NO_3)_3$, as the catalyst precursor followed by drying and calcining. The $SO_2$ oxidation experiment was conducted at 380° C. with 0.7 vol % $SO_2$ in the feed. The application reported a marked improvement in oxidation activity for both the silver promoted nickel catalyst and the gold promoted nickel catalyst compared to corresponding pure nickel catalyst.

SUMMARY OF THE INVENTION

The invention relates to new vanadium-containing catalysts for $SO_2$ oxidation which comprise gold. More specifically, the catalysts of this invention include alkali metal-promoted vanadium catalysts which are further promoted by gold. In a specific embodiment, the catalysts are supported on a support material which itself exhibits little or no catalytic activity for $SO_2$ oxidation. In specific embodiments, the catalyst supports are inert metal oxides, e.g., silica. In specific embodiments, the supported catalysts are in the form of extrudates or granules. In other specific embodiments, the catalysts are coated on inert carriers, including monolithic carriers. In a specific embodiment, the improved catalyst consists essentially of vanadium, one or more alkali metals and gold as catalytically active components. In a specific embodiment, the improved catalyst consists of vanadium, one or more alkali metals and gold as catalytically active components.

The catalysts of this invention are generally improved in that they are more active for $SO_2$ oxidation at lower temperatures compared to currently available vanadium-containing $SO_2$ oxidation catalysts and particularly with respect to alkali-metal promoted vanadium-containing catalysts. The improved catalysts of this invention result in higher conversions of $SO_2$ to $SO_3$, because they can be effectively operated at lower temperatures, where thermodynamic equilibrium favors $SO_3$ formation. More specifically, improved catalysts of this invention exhibit activity for $SO_2$ oxidation at temperatures as low as 275° C. In specific embodiments, improved catalysts of this invention are employed for $SO_2$ oxidation at temperatures ranging from 275-450° C. In more specific embodiments, $SO_2$ oxidation with improved catalysts of this invention is carried out at temperatures ranging from 300-400° C. In more specific embodiments, $SO_2$ oxidation with improved catalysts of this invention is carried out at temperatures ranging from 350-390° C. In additional embodiments, $SO_2$ oxidation with improved catalysts of this invention is carried out at temperatures ranging from 350-380° C.

The improved catalysts of this invention are particularly useful in multi-step or multi-stage $SO_2$ oxidation processes in which a gas feed stream containing $SO_2$ is passed through a series of catalytic steps or stages each having a separate catalyst bed or reactor wherein the temperature of gases entering the separate catalyst beds or reactors can be selectively controlled. In an exemplary process configuration, the temperatures of gases entering earlier steps or stages of the process are higher than in later steps or stages of such processes. In a specific configuration of such processes, the temperature of the gases entering sequential catalyst beds or reactors is decreased with the entering gas temperature of the last catalyst bed or reactor at the lowest temperature. The improved catalysts of this invention can be employed in one or more of the steps or stages of such processes, but preferably the improved catalysts of this invention are employed in at least the last catalytic step or stage of such a process. In such processes, in which at least the last catalytic step or stage employs an improved catalyst of this invention, other catalytic steps or stages of the invention can employ conventional commercial $SO_2$ oxidation catalysts, such as those which are alkali metal-promoted vanadium catalysts. In specific embodiments, at least one step or stage of the process is operated adiabatically. In specific embodiments, all steps or stages of the process are operated adiabatically.

When improved catalysts of this invention are used in the last step or stage of such a process, the gas entering the last step or stage is at temperatures at or below 400° C., preferably at temperatures at or below 390° C., and more preferably at temperatures at or below 380° C. In specific embodiments of such processes, when improved catalysts of this invention are employed as the last step or stage of the process, the gas entering the last catalytic step is at temperatures ranging from 350-400° C., at temperatures ranging from 350-390° C., at temperatures ranging from 350-380° C. or at temperatures ranging from 370-390° C. In a specific embodiment, improved catalysts of this invention are useful in carrying out the contact process for the production of sulfuric acid. In a specific embodiment, improved catalysts of this invention are useful in carrying out a double absorption process for the production of sulfuric acid. In specific embodiments, improved catalysts of this invention are useful as the catalyst in the last step or stage of a contact process or a double absorption process for the production of sulfuric acid.

Gold is present in the improved catalysts of this invention in relatively low amounts compared to vanadium and other catalytic metals. In specific embodiments, Au is present in the improved catalysts herein in an amount ranging from 0.005 to 5 wt % of total catalyst. More specifically, Au is present in supported catalysts herein in an amount ranging from 0.005 to 1 wt %. In additional embodiments, Au is present in improved catalysts herein in an amount ranging from 0.01 to 1 wt %. In additional embodiments, Au is present in improved catalysts herein in an amount ranging from 0.005 to less than 1 wt %. In additional embodiments, Au is present in improved catalysts herein in an amount ranging from 0.005 to 0.75 wt %. In additional embodiments, Au is present in improved catalysts herein in an amount ranging from 0.005 to 0.50 wt %. In additional specific embodiments, Au is present in the improved catalysts herein in an amount ranging from 0.005 to 0.05 wt %. In additional specific embodiments, Au is present in the improved catalysts herein in an amount ranging from 0.01 to 0.05 wt % or 0.01 to 0.075 wt %. In specific embodiments, gold is present in the improved catalysts herein such that the atomic ratio of Au/V ranges from $1\times10^{-5}$ to 0.1. More specifically, the atomic ratio of Au/V in the improved catalysts of this invention ranges from 0.0001 to 0.01.

In an embodiment, gold is present in the improved catalysts of this invention in the form of particles or crystallites which have at least one dimension smaller than 1 micron. In specific embodiments, gold is present in the improved catalysts of this invention in the form of nanoparticles or nanocrystallites having at least one dimension smaller than 100 nanometers. In specific embodiments, gold is present in the improved catalysts of this invention in the form of nanoparticles or nanocrystallites having at least one dimension smaller than 50 nanometers. In specific embodiments, gold is present in the improved catalysts of this invention in the form of nanoparticles or nanocrystallites having at least one dimension equal to or smaller than 25 nanometers. In specific embodiments, gold is present in the improved catalysts of this invention in the form of nanoparticles or nanocrystallites having at least one dimension equal to or smaller than 10 nanometers. In specific embodiments, gold is present in the improved catalysts of this invention in the form of nanoparticles or nanocrystallites having at least one dimension of 1-5 nanometers.

In specific embodiments, improved catalysts of this invention comprise vanadium and an alkali metal or mixture of alkali metals (AM) in atomic ratio (AM:V) ranging generally from 0.01 to 10. More specifically, the atomic ratio of AM:V in these catalysts ranges from 0.1 to 5. Yet more specifically, the atomic ratio of AM:V in these catalyst ranges from 0.2 to 2. Alkali metals useful in catalysts of this invention include cesium, potassium, rubidium, lithium and sodium. Mixtures of such alkali metals can be employed. In specific embodiments, the alkali metal is cesium, potassium, a mixture of cesium with other alkali metals or a mixture of potassium with other alkali metals. In specific embodiments, improved catalysts of this invention comprise from 1 to 20 wt % vanadium. In more specific embodiments, improved catalysts comprise from 5 to 15 wt % vanadium. In yet more specific embodiments, improved catalysts of this invention comprise from 5 to 10 wt % of vanadium. In specific embodiments, improved catalysts of this invention comprise vanadium and from 1 to 40 wt % alkali metal. In more specific embodiments, improved catalysts comprise vanadium and from 5 to 30 wt % alkali metal. In yet more specific embodiments, improved catalysts comprise vanadium and from 15 to 30 wt % alkali metal. In specific embodiments, the alkali metal is cesium or potassium. In specific embodiments, the alkali metal is cesium or a mixture of cesium with potassium, rubidium or sodium.

In specific embodiments, the improved catalysts of the invention are supported catalysts. In specific embodiments, the support is selected from silica, alumina, silica-alumina, titania, clay, zeolite, zirconia, ceria, cordierite, mullite, mullite-alumina, and mixtures thereof. In specific embodiments, the support is silica. In specific embodiments, the support is free of titanium. In specific embodiments, the support is free of silicate. In specific embodiments, the support is not a zeolite. In specific embodiments, the support can be various forms of silica including porous silica, diatomaceous earth, or amorphous silica. In specific embodiments supported catalysts comprise 35 wt % or more of the support material. In specific embodiments, supported catalysts comprise 50 wt % or more of the support material. In specific embodiments, supported catalysts comprise 75 wt % or more of the support. In a specific embodiment, the support has surface area of 50 $m^2$/g or higher.

Improved catalysts of the invention optionally further comprise a second promoter metal, other than an alkali metal or gold, which is known in the art to be a promoter of $SO_3$ oxidation by vanadium-containing catalysts. Improved catalysts of this invention optionally further comprise a second promoter which is selected from aluminum, magnesium, yttrium, lanthanum or mixtures thereof. In specific embodiments, improved catalysts contain gold particles or crystallites including, but not limited to nanoparticles or nanocrystallites, alkali metal, vanadium and a second promoter metal (P2) selected from aluminum, magnesium, yttrium or lanthanum wherein the atomic ratio of P2:V ranges from 0.1:1 to 1:1. In specific embodiments of improved catalysts containing P2, the atomic ratio of P2:V ranges from 0.2:1 to 1:1. In specific embodiments of improved catalysts containing P2, the atomic ratio of P2:V ranges from 0.2:1 to 0.5:1. In specific embodiments, improved catalysts comprise gold, alkali metal, vanadium and P2 where P2 is present in an amount ranging from 0.5 to 10 wt %. In specific embodiments, P2 is present in an amount ranging from 1 to 5 wt %.

In specific embodiments, improved supported catalysts of this invention are prepared by initial deposition of gold in the form of particles, including but not limited to nanoparticles, on a support material, such as silica. The gold-containing support is then combined with other catalytically active metals. For example, compounds of the other catalytically active metals can be mixed or kneaded with the gold-containing support. Compounds of the catalytically active metals can be in the form of solids, liquids or solutions in a selected solvent. In other embodiments, the other catalytically active metals are combined with the support containing deposited gold by deposition, impregnation, or precipitation methods.

In specific embodiments, gold is deposited upon the support in an amount such that the weight percentage of gold in the catalyst ranges from 0.005 to 5 wt % (or any sub range thereof) of total catalyst. In a specific embodiment, gold is deposited on the support by deposition precipitation. In a specific embodiment, gold is impregnated into a support by incipient wetness. In specific embodiments, gold is deposited on a support as particles by chemical vapor deposition or physical vapor deposition.

In a specific embodiment, catalysts of the invention are prepared by combining solids or solutions of the compounds of the catalytically active metals with the support containing deposited gold forming a slurry or paste comprising amounts of components selected to achieved desired compositions of vanadium, one or more alkali metals, support carrying deposited gold and one or more optional other promoters. In a specific embodiment, other catalytically active metal components are added to the gold-containing support employing deposition, impregnation, precipitation or coprecipitation. Support with deposited, impregnated or coprecipitated catalytically active metals can be formed into a slurry or paste, if desired. In specific embodiments, the slurry or paste is dried, calcined and crushed or otherwise formed into particles of selected shape or size. For example, crushed catalyst material can be sieved to achieve desired mesh size. In specific embodiments, the paste formed is of a consistency appropriate for extrusion and the paste is extruded to form particles of desired shape and size which are dried and calcined. In other specific embodiments, extruded particles or shapes of catalyst are dried, calcined and thereafter crushed or otherwise broken into granules of desired size (e.g., mesh size).

In specific embodiments, the invention provides methods of oxidizing $SO_2$ to $SO_3$ employing improved catalysts of the invention as well as methods for making sulfuric acid from $SO_3$ by oxidation of $SO_2$ in the presence of oxygen. In additional aspects, the invention provides improved catalyst compositions, in particular, improved supported catalyst. In specific embodiments, improved catalysts of the invention contain from 0.005 to less than 1 wt % gold or from 0.01 to 0.05 wt % gold. In additional specific embodiments, improved catalysts contain vanadium, one or more alkali metals, and gold in combination with an appropriate support material. In additional specific embodiments, improved catalysts contain gold deposited on a support employing deposition precipitation. In additional specific embodiments, improved catalysts contain vanadium, one or more alkali metals and gold on an appropriate support material. In specific embodiments, the catalyst is free of titanium. In specific embodiments, the catalyst is free of silicates. In additional specific embodiments, improved catalysts contain from 5 to 15 wt % vanadium and from 5 to 25 wt % alkali metal. In additional specific embodiments, improved catalysts contain a seconded promoter metal selected from aluminum, magnesium, yttrium or lanthanum. Additional aspects and embodiments of the invention will be apparent on review of the description provided including the drawings and examples.

The invention provides a method for the oxidation of $SO_2$ which comprises the step of contacting a gas stream comprising $SO_2$ and $O_2$ at temperatures between 275° C. and 450° C. with a catalyst comprising vanadium, one or more alkali metals and gold. The invention additionally provides a method for oxidation of $SO_2$ which comprises multiple sequential catalytic oxidation steps, wherein a fed gas comprising $SO_2$ and $O_2$ passes sequentially through the multiple oxidation steps to contact catalyst, and wherein at least one of the oxidation steps employs an $SO_2$ oxidation catalyst comprising vanadium, an alkali metal and gold. In specific embodiments, the oxidation step employing the catalyst comprising vanadium, an alkali metal and gold of this invention is conducted at temperatures of 400° C. or less. In a specific embodiment, the catalyst comprising vanadium, an alkali metal and gold of this invention is employed in the last $SO_2$ oxidation step in the process. In a specific embodiment, wherein the catalyst comprising vanadium, an alkali metal and gold of this invention is employed in at least one step, a vanadium containing $SO_2$ oxidation catalyst (with no gold) is employed in at least one of the other catalytic steps of the process. In a specific embodiment, the vanadium containing $SO_2$ oxidation catalyst containing no gold is an alkali metal promoted vanadium $SO_2$ oxidation catalyst.

The invention also provides a method for manufacture of sulfuric acid which comprises the steps of:
(1) oxidizing $SO_2$ to $SO_3$, employing a catalyst of this invention comprising vanadium, one or more alkali metals and gold; and
(2) absorption of $SO_3$ into sulfuric acid and reaction with water to form sulfuric acid.

In a specific embodiment, oxidizing $SO_2$ to $SO_3$ is conducted in multiple sequential catalytic oxidation steps at least one of which employs a catalyst of this invention comprising vanadium, one or more alkali metals and gold.

DETAILED DESCRIPTION OF THE INVENTION

Figure 1:
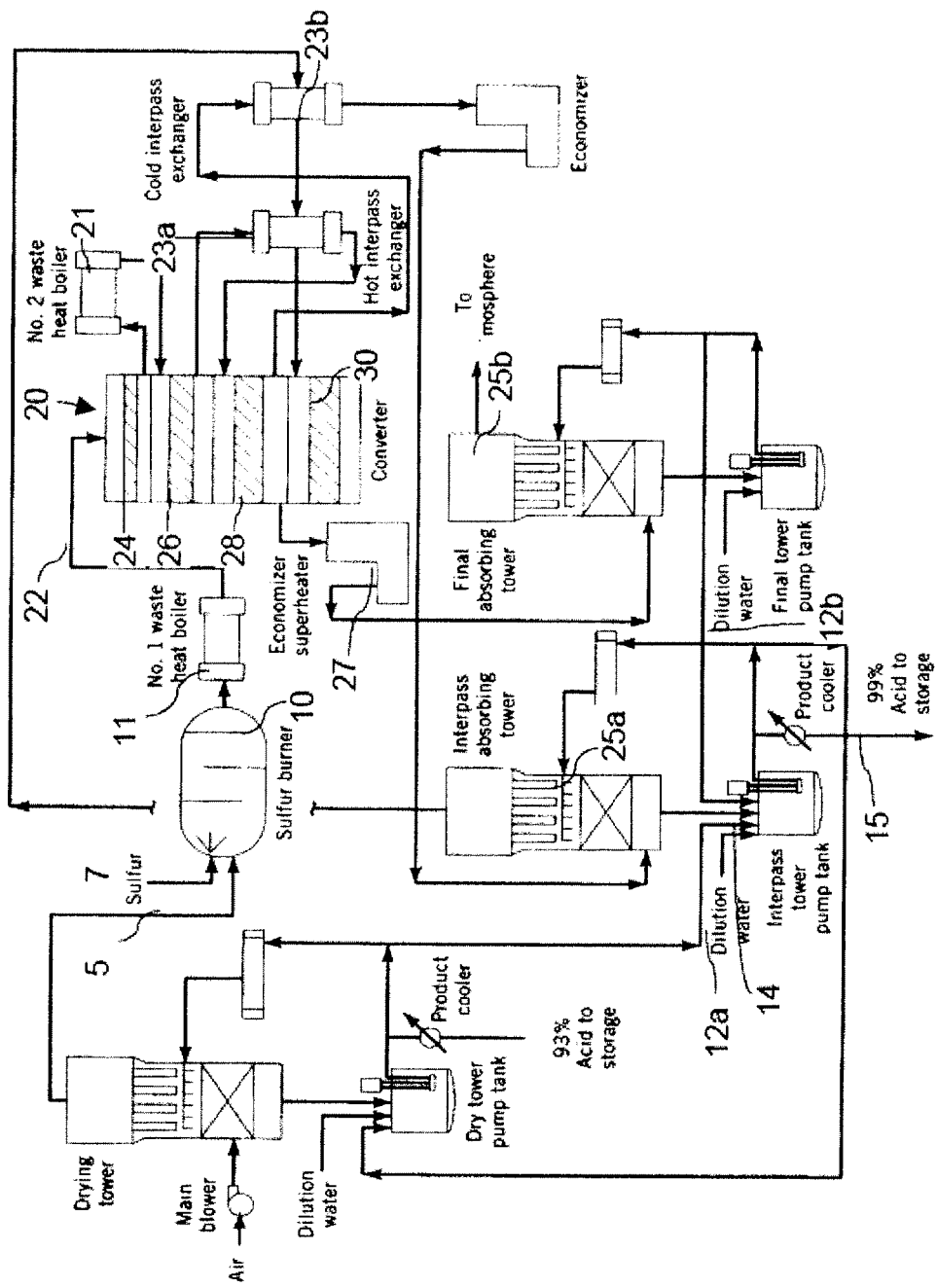
FIG. 1 shows an exemplary process flow diagram for a double absorption, contact-type, sulfuric acid plant in which $SO_2$ oxidation catalysts of this invention can be employed (figure adapted from: Müller, T. L. (2006) "Sulfuric Acid and Sulfur Trioxide," in Kirk-Othmer Encyclopedia of Chemical Technology, John Wiley and Sons.)

This invention relates to improved $SO_2$ oxidation catalysts comprising gold and methods employing the improved catalysts. Improved catalysts of this invention comprise vanadium and one or more alkali metals in addition to gold, and optionally a second promoter metal selected from aluminum, magnesium, yttrium, lanthanum or mixtures thereof. In a specific embodiment, the gold particles are deposited on a support, such as a metal oxide support, particularly silica, using methods that are known to produce gold nanoparticles. Any known method for depositing gold nanoparticles, particularly where the deposited gold nanoparticles have one dimension between 1 to 100 nm, can be employed. See, for example, U.S. Pat. Nos. 4,698,324; 4,839,327; 4,937,219; 5,051,394; and 5,789,337, discussed above. Methods reported include a modified incipient wetness method in which a metal oxide support is impregnated with gold compound followed by washing with ammonia (Delannoy et al. (2006) J. Phys. Chem. B 110(45) 22471-22478) as well as cation or anion absorption (Zanella et al. (2002) J. Phys. Chem. B 106(31) 7634-7642). Each of the foregoing references is incorporated by reference herein for its disclosure of methods for making gold nanoparticles on supports. It is understood in the art that different methods for depositing gold can form particles, including nanoparticles and nanocrystallites, which can result in different size ranges of gold particles and different gold loading on the support.

Improved supported catalysts of this invention are prepared by any known methods that provide for deposition, precipitation, coprecipitation, or impregnation of gold particles on or into a support and in combination with other catalytically active metals in absolute and relative amounts as described herein. Gold is present on or in the support in the form of particles, including but not limited to nanoparticles. In an embodiment, gold and other catalytically active metals can be deposited, precipitated or impregnated on or into a support in one or more steps. In an embodiment, gold and one or more other catalytically active metals can be coprecipitated on a support. In an embodiment, gold is deposited, precipitated or impregnated on or into a support and other catalytically active metals are thereafter deposited, precipitated or impregnated on or into the support already containing gold. In an embodiment, other catalytic metals are deposited, precipitated or impregnated on to a support and gold is thereafter deposited, precipitated or impregnated into the support containing the other catalytically active metals.

In an embodiment, gold-containing support is combined with other catalytically active metals to form a mixture. For example, compounds of the other catalytically active metals can be mixed or kneaded with the gold-containing support. Compounds of the catalytically active metals can be in the form of solids, liquids or solutions in a selected solvent. The mixture of catalyst components can be in the form of a solid, a dried solid, a paste or a slurry.

Vanadium, alkali metal and any other catalytic metals can be incorporated into the catalyst by any means known in the art including, but not limited to precipitation, coprecipitation, impregnation or any method of deposition or combination known in the art that is compatible with earlier or later deposition of gold, particularly in the form of particles, including nanoparticles, on the support. In a specific embodiment, gold at desired levels ranging from 0.005 to less than 1 wt % is dispersed on the support. In a more specific embodiment, gold at desired levels ranging from 0.005 to less than 1 wt % is deposited on the support by deposition precipitation. Augustine, R. I. (1996) "Supported Metals" in Heterogeneous Catalysts for the Synthetic Chemist (CRC Press) Ch. 13, 267-312, provides an overview of various techniques available for the preparation of supported catalysts by for example, precipitation, co-precipitation, and impregnation, including incipient wetness impregnation. This reference is incorporated by reference herein to provide details of such methods.

It is known in the art to mix compounds of catalyst components with support to form a slurry or paste which can be extruded or otherwise formed (e.g., by molding or pressing) into pellets, tablets, or rings of desired shapes and sizes (Stiles, A. B. and Koch, T. A. (1995) Catalyst Manufacture, $2^{nd}$ ed, Dekker). Ring-shaped catalysts, particularly 'star-ring" shaped catalysts are useful to reduce pressure drop in reactors. For the improved catalyst of this invention, it is preferred that gold is first deposited or dispersed on the support which is then combined with other compounds of catalyst components to form a paste. The catalyst components including support can be combined with optional binder and optional added solvent (e.g., water) to form a paste. Slurries can be similarly formed which include a higher liquid (e.g., solvent, such as water) content. The paste can be extruded or otherwise shaped and cut into granules or particles of desired size range. In other embodiments, slurries can be coated onto monolithic supports of desired shape and size appropriate for the desired application, e.g., honeycomb monoliths can be coated with slurries of catalysts of this invention. In other embodiments, pastes or slurries can be dried and crushed to a desired mesh size. See: Müller (2001) "Sulfuric Acid and Sulfur Trioxide" in Kirk Othmer Encyclopedia of Chemical Technology, Wiley Interscience; Adlkofer, J. (1997) "Oxidation of Sulfur Dioxide" in Handbook of Heterogeneous

*Catalysis*, G Ertl, H. Knozinger, and J. Weitkamp (eds) page 1774), and Stiles and Koch, *Catalyst Manufacture*, 2$^{nd}$ ed. Marcel Dekker.

In a specific embodiment, gold is deposited on the selected support material, e.g., silica. Thereafter the support containing gold is mixed or combined with one or more vanadium compounds, one or more alkali metal compounds, and optionally one or more second promoter compounds in selected amounts. On mixing or combining a paste or slurry can be formed or a solvent (such as water) can be added to dry mixed components to form a paste or slurry. In a specific embodiment, an inorganic binder is optionally included in the paste or slurry. In a specific embodiment, the vanadium compound is ammonium metavanadate. In a specific embodiment, the alkali metal compound is a sulfate salt (e.g., cesium sulfate, potassium sulfate) or a hydroxide (e.g., cesium hydroxide, potassium hydroxide).

The combinations and mixtures of catalyst components can be formed by any known method, for example by use of mechanical kneading, mixing, blending or grinding or by manual methods. See U.S. Pat. No. 3,789,019 for methods of preparing pastes and slurries which can be adapted for use in preparation of catalysts of this invention.

In the paste method, catalyst components can be combined in the form of solids, liquids, slurries or solutions (e.g., in water or sulfuric acid). The catalyst components, e.g., compounds of the catalytically active metals and support, can be wet or dry mixed. Additional liquid in the form of water, organic solvent or sulfuric acid can be added to the mixture to achieve the desired slurry or paste consistency.

Preferably a thoroughly mixed uniform slurry or paste is formed. A uniform paste is preferred for subsequent shaping or extrusion. One or more binding agents can optionally be added to the combined catalyst components or a paste thereof before shaping or extrusion. Inorganic refractory binders can be used, for example. In a specific embodiment, a silicate can be employed as the binder. Another binder that can be employed is colloidal silica, which is commercially available, for example, as suspensions comprising colloidal silica, under the trademark Ludox (TM, W.R. Grace, Columbia, Md.). In a more specific embodiment, a sodium or potassium silicate can be used as a binder. Dependent upon the compounds included in the mixture, sulfuric acid (see Examples herein) or distilled water (or both) can be added to achieve a slurry or paste of appropriate consistency for application, for example, to slurry coating or extrusion or other forms of shaping, respectively. Extruded paste or paste otherwise processed into a desired shape is dried and calcined, for example, at approximately 400° C. for several hours. Slurry-coated monoliths are similarly dried and calcined.

In alternative embodiments, catalyst powders or pastes can be compacted into desired shaped particles or tablets.

Prior to application for $SO_2$ oxidation, the catalysts of this invention are activated by heating the catalyst in $SO_2$ or $SO_3$ to temperatures ranging from 300° C. to 600° C., more preferably to 300° C. to 450° C. or yet more preferably at about 400° C. It is believed that sulfating converts at least a portion of the oxides in the catalyst into catalytically active species which may include oxysulfates.

As exemplified herein a deposition precipitation method can be employed to deposit gold particles on the support. Various methods of deposition precipitation are known in the art and can be selected by one of ordinary skill in the art for deposition of gold in the form of nanoparticles. See: Louis, C. (2007) "Deposition-Precipitation Synthesis of Supported Metal Catalysts" in *Catalyst Preparation: Science and Engineering* (ed. Regalbuto, J. R.) CRC Press, Chapter 14, pages 319-338. Exemplary deposition precipitation methods involve slow addition, release or generation of a precipitating agent (such as a base) in a vigorously stirred solution of gold compound in contact with the support, typically a slurry of the support.

Example 1 describes an exemplary deposition precipitation method employing urea which upon heating hydrolyzes gradually increasing pH. Deposition precipitation can also be conducted using known methods employing, for example, NaOH, formamide, acetamide, etc. Any suitable water soluble gold compound can be employed for deposition precipitation, in particular $HAuCl_4$ hydrate, $NaAuCl_4$; AuCN, $KAu(CN)_2$ or gold diethylamine trichloride. See: Radnik J. et al. (2006) *J. Phys. Chem. B*. 110(47):23688-23693; U.S. Pat. Nos. 4,698,324 and 4,839,327 (Haruta et al); U.S. Pat. No. 4,113,658 (Geus et al.); and Zanella R. et al. (2002) *J. Phys. Chem. B* 106(31)7634-7642. Each of the foregoing references is incorporated by reference herein for its disclosure of methods of deposition precipitation useful in preparation of the catalysts herein.

Other methods for depositing fine gold particles can be used such as the so-called polyol process where, for example, ethylene glycol is used as a reducing agent. The polyol process is well established and has been used for producing colloidal metals (including gold) in solution as well as depositing Au nanoparticles onto catalysts and catalyst supports (See: Sozana et al. "Synthesis of Gold (Au) Nanoparticles for Mercury Adsorption," *American Journal of Applied Sciences* 7(6): 835-839, 2010; Bonet et al. "Study of interaction of ethylene glycol/PVP phase on noble metal powders prepared by polyol process," *Bull. Mater. Sci.*, 23(3) June 2000, 165-168; Guoa, et al. "Facile synthesis of micrometer-sized gold nanoplates through an aniline-assisted route in ethylene glycol solution," *Colloids and Surfaces A: Physicochem. Eng. Aspects* 278 (2006) 33-38). Each of the foregoing references is incorporated by reference herein for its disclosure of methods of useful in deposition of gold for the preparation of the catalysts herein.

Other methods for depositing fine gold particles on the catalyst than can be used to make catalysts of this invention include physical vapor deposition (PVD) or chemical vapor deposition (CVD), techniques that are used in manufacturing electronic devices. When using PVD to deposit gold on a catalyst or catalyst support, gold atoms or aerosols are generated by sputtering, evaporation or any other art-known method of generating an elemental gold aerosol or vapor, and the gold vapor impinges on the surface of the catalyst depositing very fine gold particles. These particles can be nanometer to micron sized or larger (including thin films) depending on the processing conditions. It is understood in the art how to adjust deposition conditions to achieve particle deposition and to adjust particle size.

PVD is a line-of-sight process that is carried out in high vacuum (10–6 Torr or lower pressures), which has the potential to reduce the quantity of gold required if the vapor phase particle size can be well controlled. Uniform coating of the catalyst support is obtained by fluidizing, tumbling or otherwise mixing/agitating the support in the vacuum chamber while it is exposed to the flux of vapor phase elemental gold. The use of PVD to synthesize catalysts for low temperature CO oxidation is exemplified in U.S. Pat. No. 7,727,931 as well as WO 99/47726 and WO 97/43042. The method described in U.S. Pat. No. 7,727,931 is of particular interest for making catalysts of this invention. The method emphasizes the use of nanoporous support media and notes that the supports discussed in the patent include nanoporous carbon, alumina, titania, silica and the like, with or without modification by alkaline earth oxides such as Ba, Mg or Ca. The alkaline earth oxides are reported to help anchor the gold nanoparticles to the support. PVD can be used to deposit multiple metals on catalyst supports by, for example, using multiple-metal or alloy sputtering targets. U.S. Pat. No. 7,727,931, WO 99/47726 and WO 97/43042 are incorporated by reference herein for their description of PVD methods and particularly with respect to application of this method for gold particle deposition.

With respect to chemical vapor deposition for gold deposition, a gold compound is evaporated (in contrast to PVD that uses elemental gold) such that it deposits on the catalyst/support. The gold compound is then decomposed in-situ (usually thermally) leaving behind elemental gold particles. Because gold compounds are employed in CVD, the ligands of the volatile metal compound may in addition leave behind deposits in addition to gold particles. An exemplary gold compound useful for CVD is dimethylgold (III) □-diketone (Bond, G. C. and Thompson, D. T.(1999) "Catalysis by Gold", Catalysis Reviews, 41: 3, 319-388). Additional gold compounds useful for CVD include organometallic gold complexes having oxygen-free ligands (U.S. Pat. No. 7,396, 949); metal □-ketoiminate or diiminate complexes containing gold (U.S. Pat. Nos. 7,205,422 and 7,034,169); dimethylgold (III) carboxylates (Bessonov A. A. et al. (2007) Surface Coatings Technol. 201(22-23): 9099-9103); dimethyl gold acetyl acetonate (Okumura M. et al. Studies Surface Science and Catalysis (1998) 118:277-284. Of additional interest, for making catalyst of this invention are methods of aerosol assisted CVD for deposition of gold nanoparticles, as exemplified by Palgrave R. G. and Parkin I. P. (2008) Gold Bulletin 41(1):66-69. Each of these references is incorporated by reference herein for its description of CVD methods particularly with respect to application of this method for gold particle deposition.

The gold particles or crystallites in the catalysts of this invention are preferably very small gold particles, and more preferably gold nanoparticles. The term particle is used herein in reference to gold on supports to distinguish over bulk gold or gold in the form of a continuous film. The term nanoparticle refers generally to particles (or small crystals) having at least one dimension between 1 and 1000 nm. Particle size as used herein refers to average particle size. Dimensions of gold particles deposited on a support material can be measured employing methods that are well-known in the art, most commonly transmission electron microscopy (TEM). The term nanoparticle is used here to refer to average particle dimensions and does not imply any particular particle morphology or crystallographic form. The term nanoparticle includes materials which are crystalline or semi-crystalline, such as nanocrystals and nanocrystallites, nanorods, nanoflakes, nanoplates, and those that are non-crystalline. The gold nanoparticles of the catalysts of this invention may be crystalline. In specific embodiments, gold is present in the improved catalysts of this invention in the form of nanoparticles or nanocrystallites having at least one dimension smaller than 100 nanometers. In specific embodiments, gold is present in the improved catalysts of this invention in the form of nanoparticles or nanocrystallites having at least one dimension smaller than 50 nanometers. In specific embodiments, gold is present in the improved catalysts of this invention in the form of nanoparticles or nanocrystallites having at least one dimension equal to or smaller than 25 nanometers. In specific embodiments, gold is present in the improved catalysts of this invention in the form of nanoparticles or nanocrystallites having at least one dimension equal to or smaller than 10 nanometers. In specific embodiments, gold is present in the improved catalysts of this invention in the form of nanoparticles or nanocrystallites having at least one dimension of 1-5 nanometers.

In a specific embodiment, vanadium and alkali metal are impregnated into the improved catalysts of this invention employing one or more impregnation methods. In a specific embodiment, vanadium and alkali metal are impregnated into the improved catalysts of this invention employing a precipitation method. In a specific embodiment, vanadium and alkali metal are impregnated into the improved catalysts of this invention employing an incipient wetness method. In a specific embodiment, vanadium and alkali metal are incorporated into the improved catalysts of this invention employing a paste method as described herein and as known in the art.

In a specific embodiment, gold in a selected amount is incorporated into a support by impregnation. In a specific embodiment gold is incorporated into a support by incipient wetness. In a specific embodiment, catalytically active metal components are combined in selected amounts with a selected support to form a mixture. Compounds containing one or more catalytically active metals are combined with the selected support to form the mixture. Compounds containing one or more catalytically active metals can be in the form of solids, liquids or solutions in solvent (e.g., aqueous solutions). In specific embodiments, the mixture combines vanadium, one or more alkali metals, one or more optional second promoter metals and the selected support. In a specific embodiment, a combination of vanadium, one or more alkali metals and optionally one or more second promoter metals combined with and/or supported on a selected support is initially prepared having a selected relative amount of the metal or metal oxide components. In an embodiment, the combination with support is dried and then is impregnated with gold. In a more specific embodiment, the mixture is impregnated with a selected amount of gold by incipient wetness.

In a specific embodiment, catalysts of this invention are prepared by initial deposition of gold nanoparticles on a selected support followed by impregnation of that support with or deposition upon that support of other catalytically active metals. In a specific embodiment, an incipient wetness impregnation method is employed.

The term incipient wetness is used herein as broadly as it is used in the art to refer to a well-known technique for impregnating a support with metal containing solutions. In this method, a compound of the catalytically active metal is dissolved in a solvent (either aqueous or organic solvent, or mixtures thereof), the support is contacted with the solution containing active metal(s), and the solution is taken up into pores of the support. The support is optionally separated from any excess solution and may be dried and calcined (heated to decompose the compounds) to deposit metals on the support. Augustine, R. I. (1996) "Supported Metals" in *Heterogeneous Catalysts for the Synthetic Chemist* (CRC Press) Ch. 13, 267-314 provides an overview of incipient wetness as applied to preparation of supported catalysts and is incorporated herein in its entirety.

In a specific embodiment, deposition precipitation is used to deposit gold in the form of nanoparticles and optionally to deposit another of the catalytic metals of catalysts of this invention onto a selected support, e.g., silica. Deposition precipitation can be conducted employing a solution containing a gold compound and a compound of the other catalytic metal. Alternatively, gold nanoparticles can be deposited on the support in a first deposition precipitation step and the other catalytic metal or metals can be deposited in a second (or third) deposition precipitation step.

In a specific embodiment, supported catalysts of this invention are prepared by any appropriate method and thereafter formed into a paste or slurry optionally adding selected amounts of solvent (e.g., water). As described above the paste can then be shaped, for example by extrusion, dried and calcined. Extruded catalyst may cut to desired size or crushed to form granules. The slurry can be employed to coat the surfaces of refractory or related inert elements, e.g. monoliths, grids, or honeycombs, which are then dried and calcined.

In specific embodiment, a catalyst paste is prepared by initially forming a mixture of silica with gold deposited thereon with ammonium metavanadate ($NH_4VO_3$) and cesium hydroxide (CsOH). The mixture is then treated with sulfuric acid ($H_2SO_4$) to form a precipitate. The precipitate is then formed into a paste by optional addition of water. Optionally, one or more other alkali metal hydroxides can be substituted for or added to CsOH. Optionally, compounds of one or more second promoter metals can be added to the mixture. Optionally, ammonium metavanadate can be replaced with or combined with other readily available sources of vanadium, for example, compounds such as cesium metavanadate ($CsVO_3$), potassium metavanadate ($KVO_3$) or sodium metavanadate ($NaVO_3$). Optionally, potassium silicate can be added to the paste.

In a specific embodiment, the improved catalysts of the invention are supported on a support selected from silica, alumina, silica-alumina, titania, clay, zeolite, zirconia, ceria, carborundum, pumice, silicates, mullite, cordierite, mullite-alumina, and mixtures thereof. In specific embodiments, the support is silica or a mixture of silica with another support. In specific embodiments, the support is free of titanium. In specific embodiments, the support is free of silicates. The support can be in any convenient form including particles, powders, granules, fibers, or shaped pieces. In a preferred embodiment, the support is silica or a support having a content of 80% by weight or more of silica. In another embodiment, the support is silica or a support having a content of 50% by weight or more of silica. Various forms of silica can be employed including silica gel, silica other than zeolites, silica-containing zeolites, kieselguhr, diatomaceous earth, amorphous silica, colloidal silica and mixtures thereof. In specific embodiments supported catalysts comprise 35 wt % or more of a support or a mixture of supports. In specific embodiments, supported catalysts comprise 50 wt % or more of a support or a mixture of supports. In specific embodiments, supported catalysts comprise 75 wt % or more of a support or a mixture of supports. In specific embodiments supported catalysts comprise 35 wt % to 95 wt % of a support or a mixture of supports. In specific embodiments supported catalysts comprise 35 wt % to 75 wt % of a support or a mixture of supports. In specific embodiments, supported catalysts comprise 50 wt % to 95 wt % of one or more supports. In specific embodiments, supported catalysts comprise 50 wt % to 75 wt % of one or more supports. In specific embodiments, supported catalysts comprise 75 wt % to 95 wt % of one or more supports.

In specific embodiments, catalyst supports of this invention have surface areas of 10 $m^2/g$ or more. More specifically, catalyst supports of this invention have surface areas of 50 $m^2/g$ or more. More specifically, catalyst supports of this invention have surface areas of 100 $m^2/g$ or more. In additional specific embodiments, catalyst supports of the invention have surface areas between 300 $m^2/g$ and 750 $m^2/g$. In specific embodiments, catalyst supports of this invention have pore volumes of 0.5 mL/g. More specifically, catalyst supports of this invention have pore volumes of 1 mL/g or higher. In additional specific embodiments, catalyst supports of this invention have pore volumes ranging from 1 mL/g to 4 mL/g. In another specific embodiment, catalyst supports of this invention have surface areas of 100 $m^2/g$ or more and pore volumes of 1 mL/g or more. In specific embodiments, various forms of silica can be employed as catalyst supports, for example, silica powder, fumed silica, silica gel, precipitated silica, colloidal silica and diatomaceous earth can be employed as catalyst supports.

In specific embodiments, improved catalysts of this invention comprise 0.005 to 5 wt % gold, 1 to 20 wt % vanadium, 1 to 40 wt % alkali metal, optionally 0.1 to 10 wt % of other active metals with the balance being support. Weight % herein refers to elemental weight percent of the element referenced except where explicitly noted (e.g., weight percent vanadium oxide). It is noted that the listed metal species may be in the form of zero valent metal or ions. In other specific embodiments, improved catalysts of this invention comprise 0.01 to 1 wt % gold, 5 to 15 wt % vanadium, 5 to 30 wt % alkali metal, optionally 0.1 to 5 wt % of other active metals with the balance being support. In other specific embodiments, improved catalyst of this invention comprise 0.01 to 1 wt % gold, 5 to 12 wt % vanadium, 10 to 30 wt % alkali metal, optionally 0.1 to 5 wt % of other active metals with the balance being support. In other specific embodiments, improved catalyst of this invention comprise 0.005 to 0.5 wt % gold, 5 to 15 wt % vanadium, 5 to 30 wt % alkali metal, optionally 0.1 to 5 wt % of other active metals with the balance being support. In other specific embodiments, improved catalyst of this invention comprise 0.005 to 0.1 wt % gold, 5 to 15 wt % vanadium, 5 to 30 wt % alkali metal, optionally 0.1 to 5 wt % of other active metals with the balance being support. In other specific embodiments, improved catalyst of this invention comprise 0.005 to 0.5 wt % gold, 5 to 12 wt % vanadium, 10 to 30 wt % alkali metal, optionally 0.1 to 5 wt % of other active metals with the balance being support. In other specific embodiments, improved catalyst of this invention comprise 0.005 to 0.1 wt % gold, 5 to 12 wt % vanadium, 10 to 30 wt % alkali metal, optionally 0.1 to 5 wt % of other active metals with the balance being support. In other specific embodiments, improved catalyst of this invention comprise 0.005 to 0.3 wt % gold, 5 to 12 wt % vanadium, 20 to 30 wt % alkali metal, optionally 0.1 to 5 wt % of other active metals with the balance being support. In other specific embodiments, improved catalyst of this invention comprise 0.03 to 0.3 wt % gold, 5 to 12 wt % vanadium, 20 to 30 wt % alkali metal, optionally 0.1 to 5 wt % of other active metals with the balance being support.

In specific embodiments, the catalysts comprise 10 to 40 wt % active catalytic components and 90 to 60 wt % support. In specific embodiments, the catalysts comprise 10 to 30 wt % active catalytic components and 90 to 70 wt % support.

In specific embodiments, improved catalysts of this invention consist essentially of 0.005 to 5 wt % gold, 1 to 20 wt % vanadium, and 1 to 40 wt % alkali metal with the balance of the catalyst being support. In specific embodiments, improved catalysts of this invention consist essentially of 0.005 to 1 wt % gold in the form of small particles, 5 to 20 wt % vanadium, and 10 to 30 wt % alkali metal with the balance of the catalyst being support. In specific embodiments, improved catalysts of this invention consist essentially of 0.03 to 0.3 wt % gold, 5 to 12 wt % vanadium, and 20 to 30 wt % alkali metal with the balance of the catalyst being support.

In any specific embodiments herein reciting wt % gold, the gold can be in the form of particles. In any specific embodiments herein reciting wt % gold, the gold can be in the form of nanoparticles.

In specific embodiments, improved catalysts of this invention consist of 0.005 to 5 wt % gold, 1 to 20 wt % vanadium, and 1 to 40 wt % alkali metal with the balance of the catalyst being support. In specific embodiments, improved catalysts of this invention consist of 0.005 to 1 wt % gold, 5 to 15 wt % vanadium, and 10 to 30 wt % alkali metal with the balance of the catalyst being support. In specific embodiments, improved catalysts of this invention consist of 0.03 to 0.3 wt % gold, 5 to 12 wt % vanadium, and 20 to 30 wt % alkali metal with the balance of the catalyst being support.

In specific embodiments, improved catalysts of this invention comprise 5-10 wt % vanadium. In specific embodiments, improved catalysts of this invention comprise 5-10 wt % vanadium and 20-30 wt % of alkali metal. In specific embodiments, improved catalysts of this invention comprise 0.03 to 0.3 wt % gold, 5-10 wt % vanadium and 20-30 wt % of alkali metal.

In more specific embodiments, improved catalysts of this invention are silica supported catalysts comprising vanadium, alkali metal and gold in the form of particles, particularly nanoparticles, where the atomic ratio of alkali metal to vanadium ranges from 0.01 to 10 and more specifically ranges from 0.5 to 5 and yet more specifically ranges from 1 to 5. In specific embodiments, improved catalysts of this invention are silica supported catalysts comprising vanadium, alkali metal and gold in the form of particles where gold is present in an amount ranging from 0.005 to 5 wt % of catalyst (active components+support) and where the atomic ratio of alkali metal to vanadium ranges from 0.01 to 10 and more specifically ranges from 0.5 to 5 and yet more specifically ranges from 1 to 5.

It will be appreciated by one of ordinary skill in the art that metals present in the catalysts of this invention are present therein in the form of ions. It will be appreciated by one of ordinary skill in the art that metals other than gold present in the catalysts of this invention are present therein in the form of ions. It will further be appreciated that in the catalysts of this invention as prepared before activation, the metals of the catalysts other than gold, are in the form of metal oxides. As described herein, oxide catalysts of this invention are activated prior to use as catalysts for $SO_2$ oxidation by heating at temperatures ranging from 300° C. to 600° C. (more preferably at temperatures of about 400° C.) in the presence of an oxide of sulfur, e.g., $SO_2$ or $SO_3$ with or without the addition of air or oxygen. This activation process (sometimes called sulfating) is believed to convert the catalytically active metals (vanadium and alkali metals) into species that are the active components of the catalyst.

In specific embodiments, the improved catalysts of this invention do not contain nickel or an oxide or sulfate thereof. In specific embodiments, the improved catalysts of this invention do not contain chromium or an oxide or sulfate thereof. In specific embodiments, the improved catalysts of this invention do not contain iron or an oxide or sulfate thereof. In specific embodiments, the improved catalysts of this invention do not contain cobalt or an oxide or sulfate thereof. In a specific embodiment, the improved catalysts of this invention do not contain arsenic oxide. In specific embodiments, the improved catalysts of this invention do not contain zirconium or an oxide or sulfate thereof. In specific embodiments, the improved catalysts of this invention do not contain tungsten or an oxide or sulfate thereof. In specific embodiments, the improved catalysts of this invention do not contain platinum. In specific embodiments, the improved catalysts of this invention do not contain palladium. In specific embodiments, the improved catalysts of this invention do not contain silver. In specific embodiments, the improved catalysts of this invention do not contain copper or an oxide or sulfate thereof. In specific embodiments, the improved catalysts of this invention do not contain molybdenum or an oxide or sulfate thereof. In specific embodiments, the improved catalysts of this invention do not contain an alkaline earth metal or alkaline earth metal oxide. In specific embodiments, the improved catalysts of this invention do not contain magnesium or magnesium oxide. In specific embodiments, the improved catalysts of this invention do not contain scandium. In specific embodiments, the improved catalysts of this invention do not contain yttrium. In specific embodiments, the improved catalysts of this invention do not contain lanthanum. In specific embodiments, the improved catalysts of this invention do not contain hafnium. In specific embodiments, the improved catalysts of this invention do not contain tantalum. In specific embodiments, the improved catalysts of this invention do not contain titanium.

In a specific embodiment, gold is not in the form of an alloy in the improved catalysts of this invention.

The improved catalysts of this invention are useful for the oxidation of $SO_2$ to $SO_3$, at temperatures below 450° C., particularly at temperatures below 400° C. Improved catalysts herein are useful for $SO_2$ oxidation at temperatures between 275° C. and 450° C. Improved catalysts herein are useful for $SO_2$ oxidation at temperatures between 300° C. and 400° C. Improved catalysts herein are useful for $SO_2$ oxidation particularly at temperatures between 350° C. and 390° C. or 350° C. and 380° C. The improved catalysts herein are useful for low-temperature (less than 400° C.) conversion of $SO_2$ in gas streams by oxidation to $SO_3$. Catalytic oxidation of $SO_2$ combined with adsorption of $SO_3$ can be employed to remove undesired $SO_2$ from gas streams. The efficiency of the oxidation is improved by conducting the reaction at such lower temperatures.

The improved catalysts of the invention are particularly useful for $SO_2$ oxidation as a component of a process for manufacturing sulfuric acid.

Without wishing to be bound by any particular theory or mechanism of action, it may be that the gold in the catalysts herein is in the form of nanoparticles. It may be that small gold particles enhance oxygen adsorption in the improved catalysts possibly helping maintain the vanadium in the catalytically active $V^{5+}$ oxidation state thereby lowering the steady state concentration of $V^{4+}$ and $V^{2+}$ compounds, which are generally accepted to be catalytically inactive for $SO_2$ oxidation. It may also be that the gold particles help maintain the catalytically active phase in a molten state at temperatures that in the absence of gold, would otherwise solidify and decrease the activity of the catalyst. Thus, it may be that this occurs in gold-promoted catalysts more than in those catalysts which do not contain small gold particles. In embodiments herein, gold is deposited on the support employing methods that are known in the art to form gold nanoparticles or nanocrystallites, particularly those having one dimension that is less than 100 nm. It may be that some or all of this nanoparticulate structure is lost on heating of the catalyst in the presence of $SO_2$, $SO_3$ and/or oxygen, particularly as the temperatures approach or exceed 400° C., possibly due to sintering of the gold particles in the catalyst. The improved catalytic activity of the catalysts herein, however, is not observed to degrade upon heating under such conditions as is shown in examples herein.

FIG. 1 shows an exemplary flow chart for a double absorption, contact-type, sulfuric acid plant that would currently use an alkali metal promoted vanadium based $SO_2$ oxidation catalyst. The flow chart shows an $SO_2$ converter (20) having multiple catalyst beds or stages. In the United States, most plants burn elemental sulfur to generate $SO_2$; in Europe, for example, pyrite ($FeS_2$) roasting is popular. About 10% of the sulfuric acid market in the United States uses $SO_2$ generated by sulfide ore roasting. The feed gas produced by pyrite roasting and other metallurgical sources is typically of poorer quality than the feed produced by sulfur burning because mineral ores contain arsenic and other volatile contaminants that are potential catalyst poisons, that must be removed from the gas before it can be used for $H_2SO_4$ manufacture. The flow chart of FIG. 1 illustrates sulfur burning as the source of $SO_2$ for conversion to $SO_3$ and ultimately for the production of sulfuric acid. To generate $SO_2$ from elemental sulfur, liquid sulfur (7) is sprayed into a special furnace at 150 psi and 135-150° C. (sulfur burner, 10). Dry air is supplied to the furnace (5) where the $O_2$ reacts with sulfur vapor to form $SO_2$ The oxidation of elemental sulfur is very exothermic (Eq. 1), and the heat generated during sulfur burning is recovered, for example in a waste heat boiler (11). In a double absorption plant, the sulfur burner is configured to handle sulfur and air at ratios that generate a product gas containing between about 7 and 13 vol % $SO_2$, preferably 8 to 12 vol %, which is then fed with oxygen (feed gas, 22) to the first stage of the catalytic $SO_2$ oxidation reactor (converter).

Sulfur dioxide is oxidized to $SO_3$ in an adiabatic, multiple fixed bed, catalytic reactor (converter, 20). The flow chart also illustrates heat removal from the gas stream employing waste heat boilers (e.g., 21) or heat exchangers (e.g., 23a, 23b) and heat recovery (27). Product $SO_3$ is removed by absorption in sulfuric acid, for example (25a and 25b). In a particular double absorption configuration, the gas stream is passed through an absorption tower between two of the catalyst beds (between 3 and 4 as shown). Before passage through the absorption towers the gas stream is cooled. In the double absorption plant the gas stream exiting the intermediate absorption tower is reheated to reaction temperature before entering the last catalyst bed (here bed 4). Absorbed $SO_3$ is dissolved in concentrated (98%) sulfuric acid which is then reacted with water (e.g., 12a and 12b, show source of water and reaction tank 14) to generate concentrated sulfuric acid which can be diluted to a desired concentration. Product sulfuric acid is then cooled and sent to storage 15.

In addition to the $SO_2$ oxidation reaction being exothermic, it is also reversible, and exhibits a decrease in molar volume in the direction of the desired product, $SO_3$ (Eq. 1). The conversion of $SO_2$ into $SO_3$ is equilibrium limited, and unfortunately, at the temperatures needed for the oxidation to proceed at acceptable rates using existing commercial catalysts (~400° C.), the maximum per pass conversion is limited to about 60%. To compensate for the equilibrium limitation, the sulfuric acid industry has employed a number of solutions: 1) increase the $SO_2$ concentration in the feed, 2) increase the $O_2$ concentration in the feed, 3) increase the number of catalyst beds with intermediate removal of $SO_3$, 4) decrease the operating temperature of the catalyst beds, and 5) increase the pressure. (Müller (2006) "Sulfuric Acid and Sulfur Trioxide in *Kirk Othmer Encyclopedia of Chemical Technology*, Wiley Interscience). The equilibrium constant ($K_P$) for $SO_2$ oxidation to produce $SO_3$ at a particular temperature is given by Eq. 1 (Twigg, M. V. (ed) (1989) Section 10.4 "Sulphur Dioxide Oxidation," in *Catalyst Handbook*, $2^{nd}$ ed., Manson Publishing):

Equilibrium constant for $SO_2$ oxidation $$K_P = \frac{P_{SO_3}}{P_{SO_2} P_{O_2}^{0.5}} \qquad \text{Eq. 1}$$

where the $P_i$'s are the partial pressures of $SO_2$, $O_2$ and $SO_3$. Since $K_P$ is a constant at a particular temperature, increasing either (or both) the $SO_2$ or $O_2$ partial pressures (or the total pressure) will increase the partial pressure of the desired product $SO_3$. When air is the source of $O_2$, only oxygen enrichment can be used to independently increase $P_{O2}$, and generally, the cost of oxygen separation to be used for enrichment is not economical (Müller (2006) "Sulfuric Acid and Sulfur Trioxide in *Kirk Othmer Encyclopedia of Chemical Technology*, Wiley Interscience). Because the oxidation is an equilibrium, removing the product ($SO_3$) between the third and fourth beds also increases the $SO_2$ conversion. Virtually all the plants in operation today use four catalyst beds with heat removal of the heat and/or $SO_3$ removal between the beds to drive the equilibrium toward $SO_3$ The need for higher conversion is not only driven by product cost, but also by limits on the amount of unconverted $SO_2$ that can be released to the atmosphere.

Figure 2:
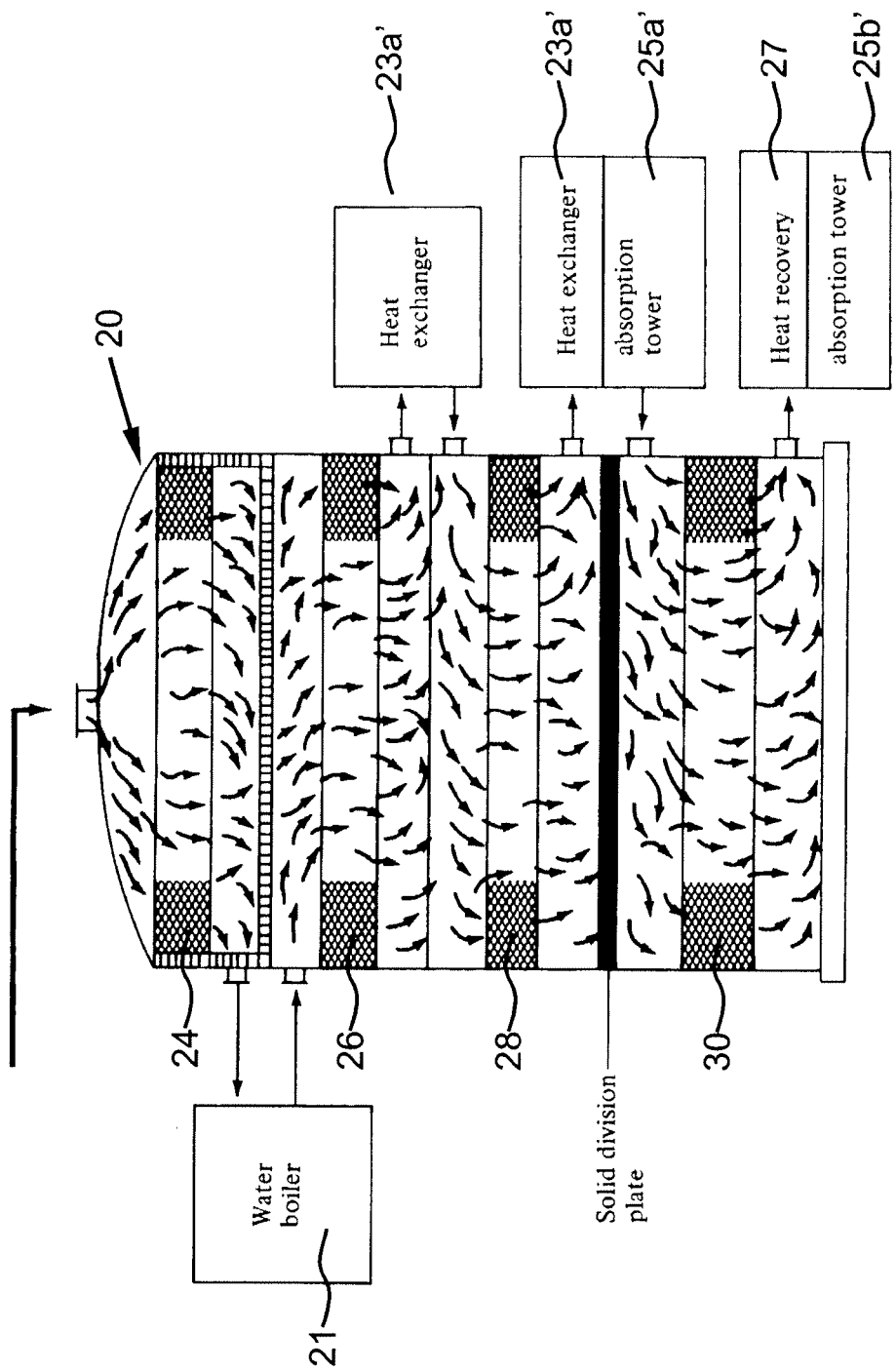
FIG. 2 is a schematic drawing of an exemplary $SO_2$ converter 20 (catalytic $SO_2$ oxidation reactor) having multiple catalyst beds for $SO_2$ oxidation catalysts used in the contact process illustrated in FIG. 1. In a specific embodiment, a catalyst of this invention is employed in the final catalyst bed of such a converter (figure adapted from Satterfield, C. N. (1991) Heterogeneous Catalysis in Industrial Practice, $2^{nd}$ ed., McGraw Hill).

FIG. 2 shows a schematic drawing of a $SO_2$ converter 20 (catalytic $SO_2$ oxidation reactor) used in the contact process illustrated in FIG. 1. The converter 20 is made of stainless steel or carbon steel, and refractory lined, as well as externally insulated to reduce heat losses. Dilute $SO_2$ (typically ~10 vol %) and air (typically ~11% $O_2$) are introduced (feed inlet, 22) at the top of the reactor into the first catalyst bed (24) (small arrows in FIG. 2 show the flow path). Typically about 65% of the $SO_2$ is converted into $SO_3$ in the first bed, see Table 1 below). The converter 20 is internally insulated, for example, with fire brick to protect the steel walls from the high temperatures associated with the reaction. Heat from the first bed is removed by cooling the gases, for example, in a waste heat boiler (21). Cooling the gases between the catalyst beds increases conversion of $SO_2$ to $SO_3$, because the equilibrium conversion decreases as temperature increases ($K_P$ in Eq. 1 decreases with increasing temperature). The product gas from the first bed (24) is cooled and then passes through the second bed of catalyst (26) where a further amount (typically ~25%) of the $SO_2$ is oxidized to $SO_3$. A portion of the outlet gas from the second bed is then cooled, for example, in a heat exchanger (23a) and fed to the third catalyst bed (28). Temperature control of the gas entering a catalyst bed may be achieved by cooling a portion of the exiting gas and mixing the cooled gas with exiting hot gas. Typically about 7% conversion occurs in the third bed (28). The gas leaving the third bed is cooled before passage into the fourth bed (30), for example the gas exiting the third bed can be cooled against the return gas from the fourth bed (29) by a heat exchanger (23b). Gas exiting a catalyst bed which contains product $SO_3$ can be passed through an $SO_3$ absorber (25a) that uses a $H_2SO_4$ to remove some selected portion or most of the $SO_3$ therein. The $SO_3$-depleted gas is then reheated with a heat exchanger and enters the fourth (and in this example the final) catalyst bed (30). After passage through the fourth bed (30), heat can be recovered (27) and the product stream is passed through an $SO_3$ absorber (25b) to produce additional sulfuric acid.

Table 1 shows the inlet and outlet gas concentrations for a typical commercial double absorption $H_2SO_4$ contactor of a 3+1 type absorption plant (Adlkofer, J. (1997) "Oxidation of Sulfur Dioxide" in Handbook of Heterogeneous Catalysis, G Ertl, H. Knozinger, and J. Weitkamp (eds.) page 1774). The contactor in this case is called a 3+1 type. i.e., 3 catalyst beds followed by $SO_3$ absorption into $H_2SO_4$, followed by a final $SO_2$ oxidation catalyst bed.

TABLE 1

| Reactor | Cumulative conversion (%) | Temp (° C.) | $SO_2$ conc. | $SO_3$ conc. | $O_2$ conc. |
|---------|---------------------------|-------------|--------------|--------------|-------------|
| 1 IN    | 0%                        | 430         | 10.0%        | 0.00%        | 10.9%       |
| 1 OUT   | 64.1%                     | 614         | 3.7%         | 6.8%         | 7.9%        |
| 2 IN    | 64.1%                     | 440         | 3.7%         | 6.8%         | 7.9%        |
| 2 OUT   | 89.9%                     | 514         | 1.1%         | 9.6%         | 6.1%        |
| 3 IN    | 89.9%                     | 425         | 1.1%         | 9.6%         | 6.1%        |
| 3 OUT   | 96.8%                     | 445         | 0.34%        | 10.4%        | 6.3%        |
| 4 IN    | 96.8%                     | 405         | 0.38%        | 0.00%        | 6.9%        |
| 4 OUT   | 99.8%                     | 416         | 0.02%        | 0.36%        | 6.8%        |

A $SO_2$ converter (also called a catalytic $SO_2$ oxidation reactor) contains a plurality of catalyst beds, typically 3, 4, or 5, such beds. The beds do not have to be in the same vessel (as shown in FIG. 2), but frequently one vessel houses the first three beds. Each catalyst bed contains a catalyst for the oxidation of $SO_2$ to $SO_3$. A feed gas stream containing $SO_2$ and oxygen enters the system passing into a first catalyst bed. The $SO_2$ concentration in the feed gas for such processes is typically 7 to 13 vol % and more preferably 8 to 12 vol % and $O_2$ is typically present in equal amounts or in slight excess by volume.

$SO_2$ can be supplied to the feed from any know $SO_2$ source. For example, $SO_2$ can be obtained from burning sulfur, from roasting sulfide ores, or from tail gases of other processes. Similarly, $O_2$ can be supplied to the feed from any known source. The $SO_2$ and $O_2$ reactants are typically diluted in nitrogen gas because air is the most common source of $O_2$. The gas stream leaving the first catalyst bed contains product $SO_3$ and unreacted $SO_2$, which is then passed sequentially to the second, third, fourth (if present) and fifth (if present) beds. The final catalyst bed is the last catalyst bed in the converter after which the gas exits the converter. In between each bed in the converter, the gas stream is cooled to adjust the inlet gas temperature to the next bed. Cooling of the gas stream can be performed using any known method. Optionally, product $SO_3$ is removed from the gas stream before the gas stream enters the next bed. Sulfur trioxide may be removed from the gas stream between one or more of the catalyst beds for further processing to sulfuric acid. Sulfur trioxide exiting the final catalyst bed is absorbed to make sulfuric acid, and any unreacted $SO_2$ is scrubbed, as necessary, by any art known method to remove $SO_2$ to levels below maximum allowed emission levels. Residual $SO_2$, if present, may be returned to the entering feed gas stream. It will be appreciated that it is preferred that the conversion of $SO_2$ to $SO_3$ and capture of $SO_3$ product prior to exiting the process be as efficient as possible to enhance the efficiency of further conversion of $SO_3$ to sulfuric acid, to avoid or minimize the need for $SO_2$ scrubbing and to minimize undesirable $SO_2$ emissions When used in the last bed of a multi-step or multi-stage $SO_2$ oxidation process, the improved catalysts of this invention provide higher conversions than conventional $SO_2$ oxidation catalysts because they can be efficiently operated at temperatures below 400° C. Improved catalysts of this invention operated at 340° C. can provide conversion of 99.6% in the fourth stage of a converter as in FIG. 2 compared to 94.7% for conventional catalysts that must operate at temperatures above 400° C. A particular benefit of the use of the improved catalysts of this invention in the last catalytic step or stage of such processes is that the tail gas exiting the converter contains lower levels of residual $SO_2$, which reduces emissions from the sulfuric acid plant. Additionally, use of the improved catalysts of this invention in older type single absorption sulfuric acid plants would also permit increased $SO_2$ conversion and lower plant emissions.

The use of lower temperature oxidation catalysts in at least the last step or stage of the converter in either existing or new plants would also significantly reduce plant energy requirements. In a plant in which $SO_3$ is absorbed between catalytic steps or stages, the gas must be cooled before absorption and then reheated before it passes to the next catalytic step or stage. Significant reductions in energy cost for reheating can be realized at least for the last step, if the inlet gas temperature is reduced. Additional energy and cost savings are achieved when plant emissions are lowered because of lower energy requirements and operating costs for $SO_2$ scrubbing.

The present invention provides Au-promoted alkali metal-vanadium based $SO_2$ oxidation catalysts which exhibit high $SO_2$ conversion at temperatures below 420° C., more particularly below 400° C. and yet more particularly below 380° C., and yet more particularly below 365° C. The catalysts of the invention are useful for $SO_2$ oxidation at temperatures between about 350° C. and 390° C. and more particularly between 350° C. and 380° C. The $SO_2$ oxidation catalysts of this invention are particularly useful as catalysts in a multi-stage $SO_2$ conversion process, particularly a multi-stage contact conversion process for the production of sulfuric acid, which employs separate catalyst beds for sequential passage of a feed gas containing $SO_2$ and oxygen through the catalyst beds. In a specific embodiment, the $SO_2$ oxidation catalysts of this invention are particularly useful as the final catalyst bed in such a conversion process. Employing the catalyst of this invention as the final catalyst bed in such a process allows the temperature of the final catalyst bed to be adjusted to be less than 400° C., more particularly less than 380° C., and yet more particularly at or below 365° C., to improve the conversion of $SO_2$ to $SO_3$, which significantly improves the overall conversion of $SO_2$ to $SO_3$ for the overall, multi-stage, sulfuric acid production process. In specific embodiments, conversions of 99.5% or higher, 99.6% or higher, or 99.8% or higher of $SO_2$ to $SO_3$ can be achieved employing catalysts of this invention. In specific embodiments of this invention, overall conversions of $SO_2$ to $SO_3$ of 99.96% or higher, 99.97% or higher or 99.98% or higher can be achieved in a multi-stage sulfuric acid contact plant when employing current commercially available alkali metal-promoted vanadium oxide $SO_2$ oxidation catalyst in the upstream (usually the first three beds), and employing the catalysts of this invention in the final catalyst bed of such a process.

The $SO_2$ oxidation catalysts of this invention generally permit operation at lower temperatures than conventional catalysts. The catalysts of this invention can be used in any of the beds of a $SO_2$ converter, but provide the greatest advantage when used in the final bed of the $SO_2$ converter. When used in the final bed, the catalysts of the invention can carry out the final oxidation step at temperatures as low as 320° C. to 350° C., which leads to higher equilibrium $SO_2$ conversions to $SO_3$. Additionally, the oxidation catalysts of this invention can be used as a drop-in replacement for any of the conventional catalyst beds currently employed in commercial $SO_2$ conversion processes, but again the catalysts of this invention are especially advantageous when used as a replacement for the conventional final bed catalyst, with a shift in process conditions to lower the final step temperature to less than 400° C., more particularly less than 390° C., yet more particularly at or below 380° C. and even as low as about 350° C. As a drop in replacement for current catalysts, there is no need to modify current $SO_2$ converter or other plant equipment. Adaptation of current $SO_2$ converters to use the lower temperature catalyst of this invention is routine to one of ordinary skill in the art.

In a specific embodiment, the present invention provides a process for converting $SO_2$ to $SO_3$ in a multi-step or multi-stage catalytic process which comprises three or more of such catalytic steps or stages wherein the last catalytic step or stage is conducted employing an improved catalyst of this invention comprising small gold particles. The last catalytic step or stage of the process is then conducted at temperatures less than 400° C., preferably at temperatures less than 390° C. and particularly at temperatures between about 350° C. and 390° C. Catalytic steps or stages of the process other than the last stage are conveniently conducted employing $SO_2$ oxidation catalysts that operate at generally higher temperatures than the lower temperature catalysts of this invention. In a specific embodiment, the catalytic steps or stages of the reaction other than the last step or stage are conducted at temperatures of 380° C. or higher, at a temperature of 390° C. or higher, at temperatures of 400° C. or higher, or more preferably at temperatures higher than 400° C. In specific embodiments, the catalysts of this invention are used in $SO_2$ converters that have three, four or five catalytic steps or stages.

Conventional $SO_2$ catalysts useful in higher temperature steps or stages of multi-step or multi-stage processes include those comprising vanadium preferably in combination with an alkali metal promoter, such as cesium or potassium, but do not contain gold. These higher temperature catalysts are typically supported catalysts, on supports including silica.

The $SO_2$ oxidations of this invention can be conducted at ambient pressures or higher. In specific embodiments, $SO_2$ oxidation employing the improved catalysts of this invention is conducted at ambient or slightly higher than ambient pressures. In specific embodiments, $SO_2$ oxidation employing the improved catalysts of this invention is conducted at pressures above ambient up to about 2 atmospheres.

It will be appreciated by one of ordinary skill in the art that the process flow diagram of FIG. 1 and the schematic $SO_2$ converter of FIG. 2 are illustrious of equipment and processes known in the art for implementing $SO_2$ conversion to $SO_3$ using multiple catalyst beds or stages. The ordinary skilled artisan will recognize a number of variations of such processes and equipment that can be readily employed or routinely adapted to achieve such conversion.

When a Markush group or other grouping is used herein, all individual members of the group and all combinations and possible subcombinations of the group are intended to be individually included in the disclosure. Every combination of components or materials described or exemplified herein can be used to practice the invention, unless otherwise stated. One of ordinary skill in the art will appreciate that catalysts, supports, starting materials, synthetic methods, reaction conditions, reactor configurations, methods, device elements, and materials other than those specifically exemplified can be employed in the practice of the invention without resort to undue experimentation. All art-known functional equivalents, of any such methods, device elements, and materials are intended to be included in this invention. Whenever a range is given in the specification, for example, a temperature range, a frequency range, a time range, or a composition range, the ranges given are inclusive (unless specifically stated otherwise), and all intermediate ranges and all subranges, as well as, all individual values included in the ranges given are intended to be included in the disclosure. Any one or more individual members of a range or group disclosed herein can be excluded from a claim of this invention. The invention illustratively described herein suitably may be practiced in the absence of any element or elements, limitation or limitations which is not specifically disclosed herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The term "comprising" is intended to be broader than the terms "consisting essentially of" and "consisting of", however, the term "comprising" as used herein in its broadest sense is intended to encompass the narrower terms "consisting essentially of" and "consisting of", thus the term "comprising" can be replaced with "consisting essentially of" to exclude steps that do not materially affect the basic and novel characteristics of the claims and "comprising" can be replaced with "consisting of" to exclude not recited claim elements.

Although the description herein contains many specifics, these should not be construed as limiting the scope of the invention, but as merely providing illustrations of some of the embodiments of the invention.

Each reference cited herein is hereby incorporated by reference in its entirety. However, if any inconsistency arises between a cited reference and the present disclosure, the present disclosure takes precedent. Some references provided herein are incorporated by reference to provide details concerning the state of the art prior to the filing of this application, other references may be cited to provide additional or alternative device elements, additional or alternative materials, additional or alternative methods of analysis or applications of the invention. Patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

One of ordinary skill in the art will appreciate that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

Example 1

Au-Promoted, Alkali-Metal-Vanadium Supported Catalyst

Deposition precipitation is employed to prepare the Au-promoted cesium-vanadium supported catalysts of this invention. The support (e.g., silica) is combined with an aqueous urea solution, a selected amount of a gold compound, (e.g., $HAuCl_4.3H_2O$) is added and the mixture is slowly heated. As the temperature increases to about 90° C., urea slowly decomposes into ammonia ($NH_3$) and $CO_2$. The ammonia makes the solution basic and the $CO_2$ is vented to the atmosphere. The $Au(OH)_3$ precipitates onto the support. Since the process is slow, the precipitation of $Au(OH)_3$ is also slow, and $Au(OH)_3$ forms small, possibly nanometer sized particles on the surface of the support. Heating converts $Au(OH)_3$ into Au into small gold particles (Bond et al 2006). Vanadium and cesium are then added to the support that has been modified by the addition of small gold particles. More specifically, Au is deposited onto a silica support using a standard deposition-precipitation method with gold (III) chloride trihydrate ($HAuCl_4.3H_2O$, also known as chloroauric acid) as the gold precursor. Several examples of deposition precipitation are given in Bond, G. C.; Louis, C. and Thompson, D. T. (2006) *Catalysis by Gold*, Imperial College Press.

The $Au/SiO_2$ material is then combined with alkali metal hydroxide (e.g., cesium hydroxide (CsOH) or a mixture of alkali metal hydroxides), sulfuric acid ($H_2SO_4$) and a vanadium compound, such as ammonium metavanadate ($NH_4VO_3$) to form a mixture. The mixture is then optionally dried. The mixture as formed may be a paste which is optionally combined with one or more binders. Alternatively, after drying the mixture can be formed into a paste and optionally combined with one or more binders. For example, the mixture can be combined with potassium silicate solution (e.g. Kasil-6) with optional water addition to adjust paste consistency. Pastes with or without binders, can be extruded. The extruded catalyst is then dried and calcined for approximately 10 hours at 400° C. Other inorganic refractory binders, such as alkali metal silicates (in powder or preferably in aqueous solutions) can be used such, as water glass, which is a sodium silicate solution. Optionally, the dried catalyst can be mixed with colloidal silica (Ludox, Trademark, W.R. Grace & Co., Columbia Md.)) or other additional binder and extruded. The addition binders are believed to increase the strength of the extruded shapes. The preferred composition range of the $SO_2$ oxidation catalysts of this invention is given in Table 2.

TABLE 2

Preferred Compositional Range of Au-Promoted $SO_2$ Supported $SO_2$ Oxidation Catalysts

| Component | Range (wt %) |
|---|---|
| Gold | 0.005-5.0 |
| Vanadium | 1.0-20 |
| Alkali metal (Li, Na, K, Rb, Cs, and mixtures thereof; preferably Cs) | 1.0-40 |
| Catalyst support (silica, alumina, silica-alumina, titania, clay, zeolite, zirconia, ceria, and mixtures thereof; preferably silica) | Balance |

1. Exemplary Preparation of 0.5% Gold on Silica

Urea (50.0 g, Aldrich U5128) is dissolved in water (500 mL, deionized or distilled). The urea solution is then added to silica powder (50.0 g, PQ Corporation MS3050, multi-point surface area 515 m²/g; pore vol. 3.08 mL/g median particle size 92 micron). Gold (III) chloride trihydrate ($HAuCl_4.3H_2O$ 0.5 g, 0.00127 mole Au) is then added to the urea/silica slurry and heated to and then maintained at 90° C. with vigorous stirring. The pH of the mixture is monitored until the pH reaches 7 (approx. 4-5 hours at 90° C.). A test aliquot is removed from mixture to a screw cap vial and allowed to settle and the color of the solution is observed. If no yellow color is observed in the aliquot the reaction is complete. If residual yellow coloration is observed (meaning that some $HAuCl_4.3H_2O$ is still in solution), heating at 90° C. with vigorous stirring is continued. Upon completion of the reaction, the mixture is vacuum filtered to collect the $Au/SiO_2$ which is then washed with water (deionized or distilled) until no chloride ion is observed in the filtrate (e.g., using a standard silver nitrate test). The collected $Au/SiO_2$ is then dried in an oven at 100° C. overnight and stored in a tightly capped jar for further use.

2. Exemplary Addition of Vanadium and Cesium to $Au/SiO_2$ Paste Method

Sulfuric Acid (37 wt %, which is made by mixing 27.5 g of 96% $H_2SO_4$ with 44.1 g of deionized or distilled water) is cooled in a cold water bath prior to use. Ammonium metavanadate ($NH_4VO_3$, 11.78 g, 99+% Aldrich 39, 812-8) is then combined with 50 wt % cesium hydroxide (CsOH) solution (23.20 g, 99% pure, 50 wt % solution in water, Aldrich 232068) and mixed well in a porcelain mortar. The entire 71.6 g of the chilled $H_2SO_4$ solution is then slowly poured into the mixture in the mortar. A brick-red colored material forms and ammonia ($NH_3$) gas is evolved. The resulting material, which has a paste-like consistency, is then carefully ground and mixed well with 23.6 g of the $Au/SiO_2$ (0.5 wt % Au).

To form a paste for extrusion, a potassium silicate solution (16.0 mL, Kasil 6, PQ Corp, a 2.1 ratio potassium silicate, as a 39.2% solution in water) is added to the entirety of the $Au/Cs—V_2O_5/SiO_2$ powder and mixed well until a very uniform paste is obtained (at this point a little deionized or distilled water can be added to help with the mixing, if necessary). The mixed paste is then extruded onto a glass surface (a disposable syringe can be employed for small amounts or a mechanical extruder can be used for larger batches). The extruded material is dried at 100° C. overnight in an oven. The extrudates formed in this manner are somewhat fragile, and optionally, a second binder (e.g. colloidal silica—Ludox, Trademark, WR Grace & Co., Columbia Md.) can be added to strengthen the extrudates. When calcined, the colloidal $SiO_2$ particles in Ludox bind together and to the silica support, increasing the mechanical strength of the extrudates.

The catalyst is activated by treatment with $SO_2$, $SO_3$ and air at 400° C. for at least 10 hours (even as long as overnight) in a process referred to as sulfating. This is done by flowing a gas mixture containing 2.5% $SO_2$, 4.2% $O_2$ and 93.3% $N_2$ through the catalyst bed ($SO_3$ is also present as it is formed by the oxidation of $SO_2$). Sulfating is done in-situ in the test reactor for several hours. The catalyst is then cooled and can be removed and stored until needed, or immediately tested. After addition of the vanadium and cesium to the 0.5% $Au/SiO_2$, calcination and activation, the Au content of the resulting catalyst is decreased to 0.15% by weight of supported catalyst (because approximately ⅓ of the total weight of the catalysts is from the original 0.5% $Au/SiO_2$.

3. Exemplary Catalyst Synthesis by Incipient Wetness

The catalyst prepared by incipient wetness contains 0.5% (w/w) Au deposited onto the base ($Cs—V_2O_5/SiO_2$) catalyst. The base catalyst is prepared as in Example 1 using plain silica that has not been modified by gold. Fifty (50) grams of base catalyst requires 0.25 g of gold. Prior to depositing the gold on the base ($Cs—V_2O_5/SiO_2$) catalyst, the amount of aqueous solution that each gram of base catalyst can take up must be determined. For 1.0 g of base catalyst that has been ground and sieved to the desired side, deionized water is slowly added with stirring until the catalyst particles just begin to stick together, which indicates that liquid water is just beginning to collect on the external surface of the catalyst particles and that the catalyst pores have been filled. One gram of base catalyst was completely wetted by 0.45 g of deionized water. Therefore preparing 50.0 g of catalyst by incipient wetness requires 21.6 g of solution. $HAuCl_4 \cdot 3H_2O$ (0.5 g) is dissolved in 21.6 g $H_2O$. The catalyst is slowly wet with the $HAuCl_4$ solution. The catalyst is stirred well during solution addition until all of the catalyst is evenly wetted. The wetted catalyst is then placed in a drying oven at 110° C. for 4 hours to remove water. The catalyst is then calcined, sulfated and tested.

Example 2

Catalyst Testing

1. Reactor

A sulfur dioxide ($SO_2$) oxidation apparatus having a gas inlet manifold system, a reactor, an electronic online gas analyzer, and a vent gas scrubbing system was employed for catalyst testing. Gases are metered into the system using electronic mass flow controllers (MFC). The catalytic reactor is made from a 1-inch diameter, type 316, stainless steel VCR metal face seal fitting that uses sintered stainless steel filter gaskets to support the catalyst. The reactor can safely operate at elevated pressures and at temperatures in excess of 400° C. The temperatures of the inlet gas and catalyst bed are measured using type-K thermocouples.

The reactor body is heated in an electric tube furnace that is computer-controlled and equipped with over-temperature shutdown capability. Electronic mass flow controllers are used to meter in zero grade air (21% $O_2$+79% $N_2$), a mixture of 5% $SO_2$ in $N_2$ and 100% $N_2$. The mixed gases flow through a heating-tape-traced section of tubing upstream of the reactor to preheat the feed gas to reaction temperature. The preheated feed gases then pass down (gas inlet at top) through the catalyst bed located in the reactor. Product gas exits from the bottom of the reactor that contains nitrogen, unreacted $O_2$, unreacted $SO_2$ and the desired product, sulfur trioxide ($SO_3$).

Sulfur trioxide is an extremely corrosive, strong and hazardous oxidizing agent (Griffiths, R. (1996) *Sulphur Trioxide, Oleum and Sulphuric Acid*, Major Hazards Monograph, Institute of Chemical Engineers, UK.) and would damage the downstream online $SO_2/O_2$ analyzer if not removed. $SO_3$ is removed by scrubbing the product gas exiting the reactor by passing it through a bubbler containing concentrated (98%) sulfuric acid ($H_2SO_4$) at room temperature as recommended by Donovan et al in (Donovan, J. R.; Stolk, R. D. and Unland, M. L. (1983) "Oxidation Catalysts for Sulfuric Acid Production," Ch. 7 in *Applied Industrial Catalysis*, Vol 2, B. E. Leach (ed.) Academic Press). When the $SO_3$ is bubbled through $H_2SO_4$, sulfur trioxide dissolves in (and reacts with) the sulfuric acid. Unreacted $SO_2$, $N_2$ and unreacted $O_2$ pass through the $H_2SO_4$ scrubber unchanged. The solubility of $SO_2$ in the sulfuric acid scrubber is negligible so the $SO_2$ measured by the online analyzer located downstream of the $H_2SO_4$ scrubber is representative of the amount of unreacted $SO_2$ in the product gas exiting the reactor (F. D. Miles and T, Carson, "The Solubility of Sulphur Dioxide in Fuming Sulphuric Acid," *J. Chem. Soc.*, (1946), 786-790).

The $SO_2$ conversion is calculated from the measurement of the $SO_2$ concentration downstream of the $H_2SO_4$ scrubber. Real-time determination of the concentration of unreacted $SO_2$ and unreacted $O_2$ in the product gas downstream of the $H_2SO_4$ scrubber is made using a Fluorescent High Range $SO_2$ Analyzer (Teledyne Instruments Model 100 EH). The analyzer also has a paramagnetic sensor for measuring the $O_2$ concentration in the gas. The gas exiting the analyzer is scrubbed by bubbling it through a carboy filled with dilute sodium hydroxide (NaOH) before being vented to the laboratory fume hood system.

Prior to activity testing, the catalyst is sulfated, which is done by placing approximately 25 grams of catalyst in the reactor and heating it to 400° C. in a flow of 2.5% $SO_2$, 4.2% $O_2$ and 93.3% $N_2$ at a space velocity of 1000 $cm^3_{gas}/cm^3_{catalyst}/hr$. The catalyst is maintained under these conditions for at least four hours to as long as overnight. During this "sulfating" period, the gas steam is diverted around the gas analyzer (to protect it from potential damage) and flows directly into a caustic scrubber. Treating the catalyst with $SO_2$ at 400° C. activates the catalyst for $SO_2$ oxidation, presumably by forming alkali/cesium-vanadyl-oxysulfate species that have been reported to be responsible for $SO_2$ oxidation activity. After $SO_2$ treatment, the reactor temperature is adjusted for the first test. The gas flows are also adjusted to deliver required amounts of $SO_2$, $O_2$ and $N_2$ flowing through the catalyst bed at selected space velocities between 500 and 2000 $cm^3_{gas}/cm^3_{catalyst}/hr$ (frequently abbreviated as $h^{-1}$).

The apparatus is computer controlled (LabVIEW process control) which permits programming a test sequence where the catalyst bed temperature is periodically changed and maintained for a predetermined time. Because of the small volume and mass of the catalyst bed (~25 cc and 25 g) relative to the surface area and mass of the reactor, and because of the low $SO_2$ concentrations used in the tests, only a slight increase in temperature is observed due to the heat generated by the exothermic $SO_2$ oxidation reaction. By proper selection of the furnace temperature, the catalyst can be maintained at the desired test temperature.

2. Catalyst Test Results

A control catalyst ("base" catalyst) with no gold containing 13 wt % vanadium oxide (equivalent to 7.3 wt % as elemental V) and 26 wt % cesium oxide (equivalent to 24.5% as elemental Cs) silica ($SiO_2$) was employed for comparison with Au-promoted catalysts (the base $Cs—V_2O_5/SiO_2$ catalyst discussed in Example 1). The base catalyst was prepared as described in Example 1 with the exception that the silica was not first treated with gold. The Au-promoted catalysts initially tested contained either 0.03 or 0.15 wt % Au both with 13 wt % $V_2O_5$ and 26 wt % $Cs_2O$ as noted above) and were prepared as in Example 1.

The conversion of $SO_2$ is calculated using the equation:

$$\frac{SO_2^{Baseline} - SO_2^{Measured}}{SO_2^{Baseline}} \times 100\% \qquad \text{Eq. 2}$$

where $SO_2$ (baseline) refers to the $SO_2$ concentration measured by the online gas analyzer, and $SO_2$ (measured) is the concentration of $SO_2$ measured in the product gas (also using the online gas analyzer). Because the online gas analyzer requires a minimum flow of 1 liter/min and the flow rate of product gas from the catalyst test reactor is not this high, a constant flow of makeup nitrogen gas is blended with the product gas downstream of reactor and just upstream of the $SO_2$ analyzer. Thus, the baseline (feed gas bypassing the reactor) will be lower than the 3800 or 7000 ppm $SO_2$ metered into the inlet of the catalytic reactor using the electronic mass flow controllers. Since the makeup $N_2$ flow is constant, known and regularly checked, the $SO_2$ conversions calculated using Eq. 2 are accurate.

Figure 3:
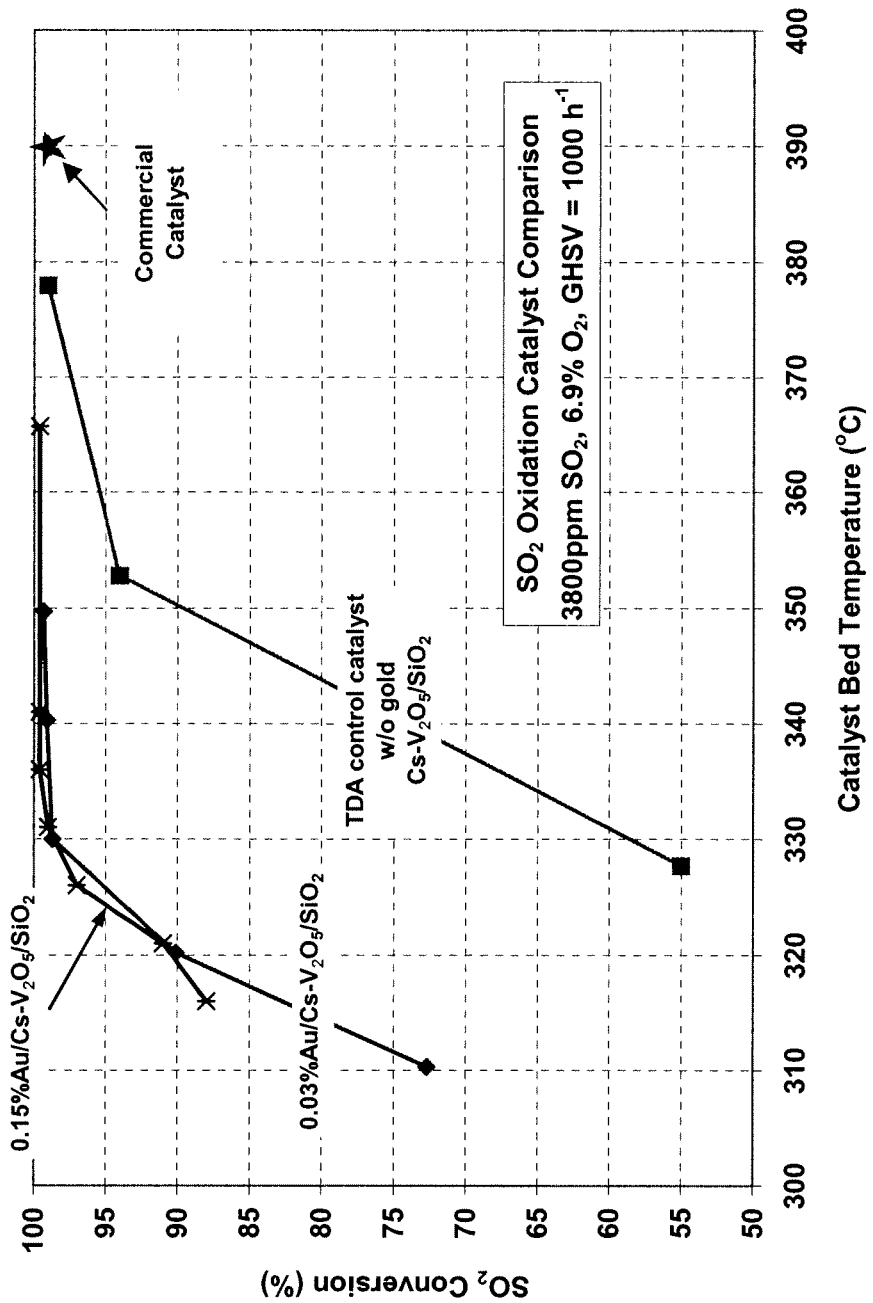
FIG. 3 is a graph of $SO_2$ conversion (%) as a function of temperature comparing a control supported cesium-doped vanadium catalyst (■, 13 wt % vanadium oxide (equivalent to 7.3 wt % as elemental V) and 26 wt % cesium oxide (equivalent to 24.5 wt % as elemental Cs) on silica ($SiO_2$) with Au-promoted catalysts of this invention 0.03% Au (♦) or 0.15% Au (*). Performance typical of a commercial catalyst at 390° C. is indicated with a star.

FIG. 3 shows the $SO_2$ conversion for control (no gold) catalyst (■) and 0.03 wt % and 0.15 wt % Au-promoted catalysts (♦ and *, respectively) made by the deposition precipitation method of Example 1. A point (star at 390° C.) illustrates the typical performance of a $4^{th}$ bed commercial catalyst and is included as a reference. The base/control catalyst with no Au added exhibits significantly lower $SO_2$ conversions compared to the Au-promoted catalysts of this invention at temperature below 350° C., but exhibits about the same level of $SO_2$ conversion activity as the commercial catalyst at 380° C. to 390° C. For comparison with the catalysts where the Au was added to the silica support by deposition precipitation, several catalysts were also prepared where the base ($Cs-V_2O_5/SiO_2$) catalyst was impregnated (incipient wetness method) with a solution of $HAuCl_4 \cdot 3H_2O$. The Au-promoted catalysts prepared by incipient wetness rather than the deposition precipitation method of Example 1 were found to be more active at lower temperatures than the no-Au base catalyst, but not nearly as active as the catalysts where Au was added by deposition precipitation. For the results shown in FIG. 3 and FIG. 4, the initial $SO_2$ concentration was 3800 ppm and the feed contained 6.9 vol % $O_2$, with the balance being $N_2$.

Figure 4:
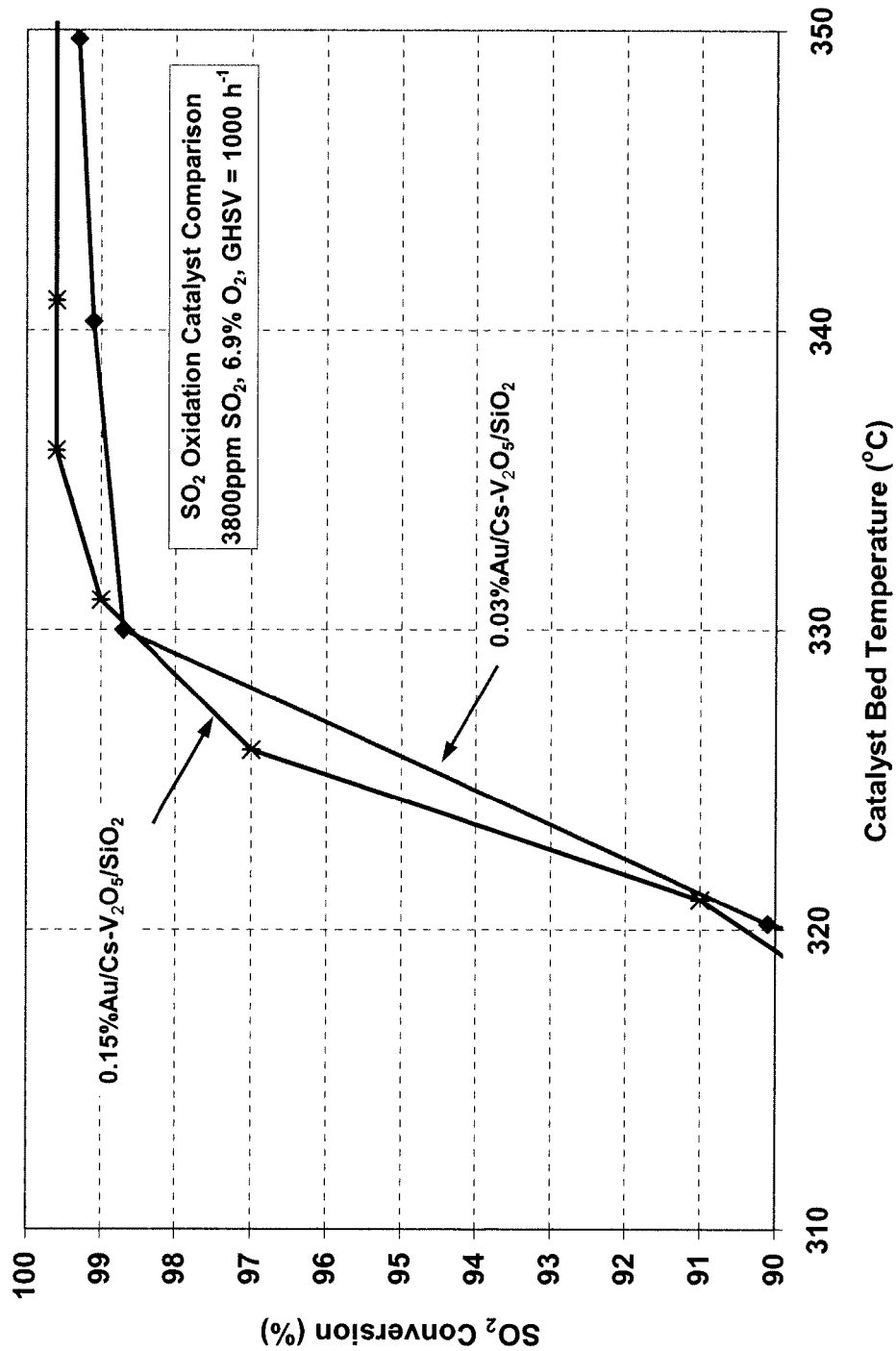
FIG. 4 is an enlargement of a portion of the graph of FIG. 3 showing the results for Au-promoted catalysts 0.03% Au (♦) or 0.15% Au (*) between 310° C. and 350° C.

FIG. 4 is an enlarged view of the data for the Au-promoted catalysts (0.03% Au, ♦ and 0.15% Au, *) between 300° C. and 350° C. Both catalysts exhibited similar activity versus temperature behavior. At 320° C., the 0.03% $Au-Cs-V_2O_5/SiO_2$ catalyst converted about 90% of the $SO_2$ and the 0.15% $Au-Cs-V_2O_5/SiO_2$ catalyst converted about 90%. By 340° C., both catalysts give conversions greater than 99%. Therefore, adding as little as 0.03 wt % Au to the catalyst permitted lowering the operating temperature from near 400° C. (required by conventional catalysts) to 340° C., which permits increasing the $SO_2$ conversion to 99.6% which represents 99.7% of the theoretical thermodynamic conversion limit.

Figure 5:
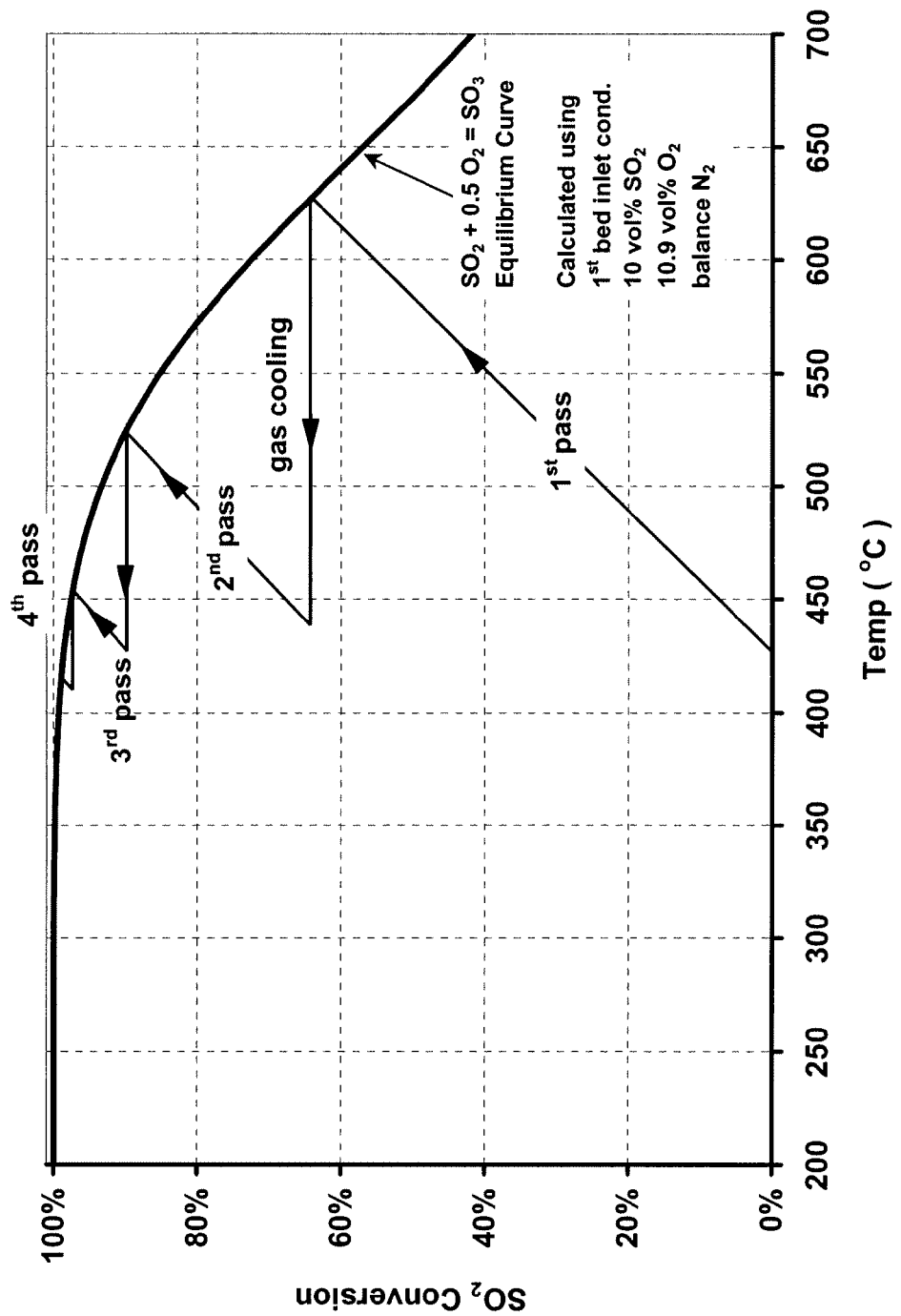
FIG. 5 is a graph showing the equilibrium curve for $SO_2$ oxidation to $SO_3$ starting with 10% $SO_2$ and 10.9% $O_2$ (from air) typical of first catalyst bed conditions. The lines show the temperature vs. $SO_2$ conversion behavior for typical commercial catalysts used in a converter such as the one shown in FIG. 2. The sloped lines indicate adiabatic heating within each individual catalyst bed, and the horizontal lines show gas cooling between beds.

FIG. 5 illustrates $SO_2$ conversion in a 3+1 $SO_2$ converter (such as in FIG. 2) showing the equilibrium curve for $SO_2$ oxidation to $SO_3$ starting with 10% $SO_2$ and 10.9% $O_2$ (from air) typical of first catalyst bed conditions. The lines show the temperature vs. $SO_2$ conversion behavior for typical commercial catalysts used in a converter such as the one shown in FIG. 2. The sloped lines indicate adiabatic heating within each individual catalyst bed, and the horizontal lines show the effect of external gas cooling between beds.

Figure 6:
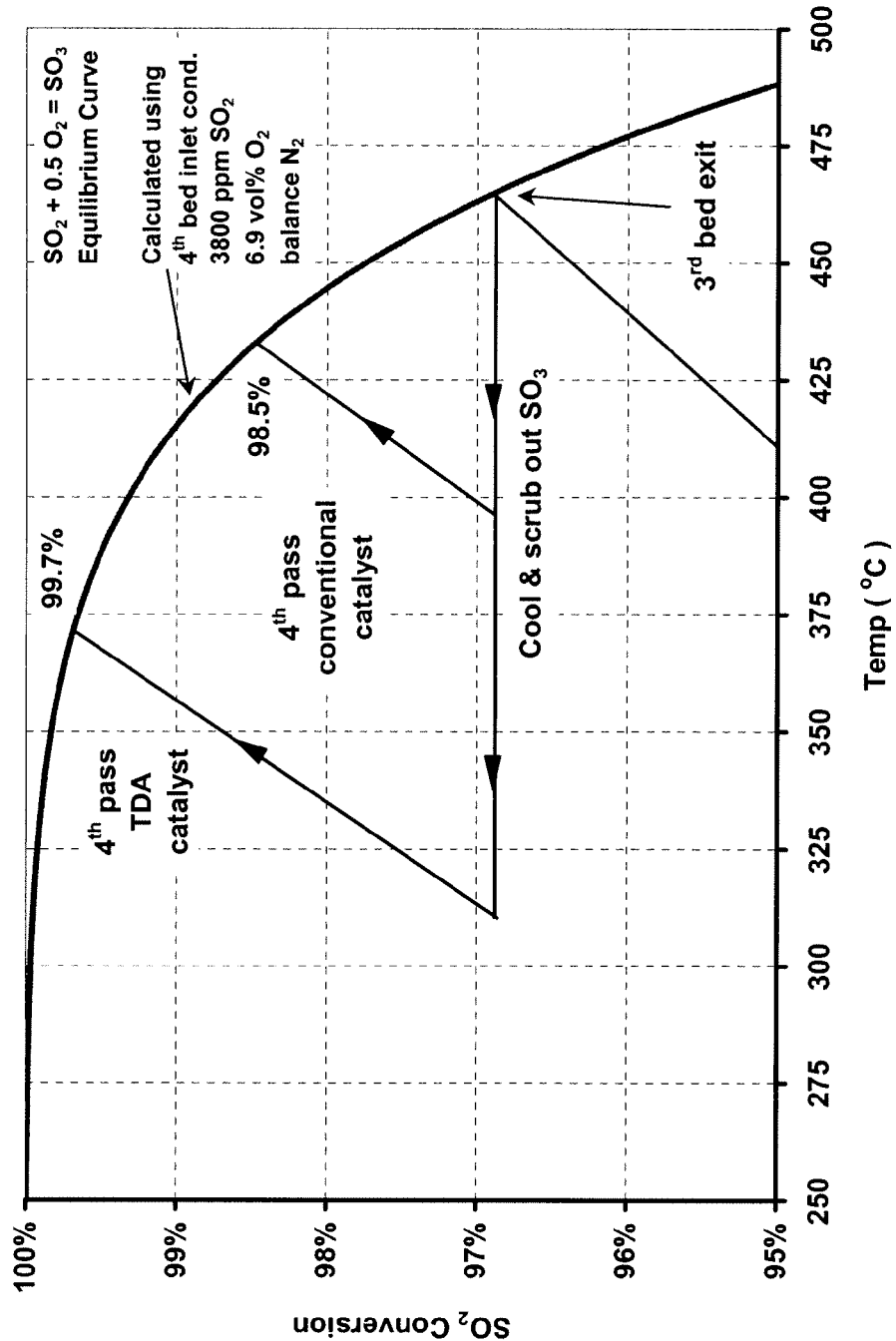
FIG. 6 is a graph that shows $SO_2$ conversion versus temperature for the last catalyst bed. The equilibrium curve is slightly different than that of FIG. 5 because $SO_3$ is removed by scrubbing between beds 3 and 4. The equilibrium curve was calculated using 3800 ppm $SO_2$, 6.9% $O_2$, balance $N_2$ as the feed. The lines indicate the improved performance possible in the fourth bed comparing the $SO_2$ conversion that can be obtained in a conventional converter (as in FIG. 2) employing a Au-promoted $SO_2$ oxidation catalyst of this invention (labeled TDA catalyst) because of the lower operating temperature, with that of a typical commercial $SO_2$ oxidation catalyst.

FIG. 6 is a graph that shows $SO_2$ conversion versus temperature for the last (in this case $4^{th}$) catalyst bed. The equilibrium curve is slightly different than that of FIG. 5 because $SO_3$ is removed by scrubbing between beds 3 and 4, which shifts the equilibrium toward $SO_3$. The equilibrium curve was calculated using 3800 ppm $SO_2$, 6.9% $O_2$, balance $N_2$ as the feed. The lines indicate the improved performance possible in the fourth bed when employing a Au-promoted $SO_2$ oxidation catalyst of this invention (labeled TDA catalyst) because of the lower operating temperature compared to a typical commercial $SO_2$ oxidation catalyst. $SO_2$ conversion data for the conventional catalyst were obtained from Table 1

By using an Au-promoted $SO_2$ oxidation catalyst of this invention in the final catalytic stage (pass) and operating that final stage at 340° C., the maximum thermodynamic equilibrium limit for $SO_2$ conversion is 99.89%. As shown in FIG. 3, 99.6% conversion was experimentally obtained in a single catalytic pass at 340° C. This corresponds to an overall $SO_2$ conversion through the entire converter of FIG. 2 of 99.98% based on an inlet $SO_2$ concentration of 10 vol %. This is substantially higher than the maximum thermodynamic yield of 99.95% possible with a conventional catalyst which operates at significantly higher temperature, e.g., 416° C.

Figure 7:
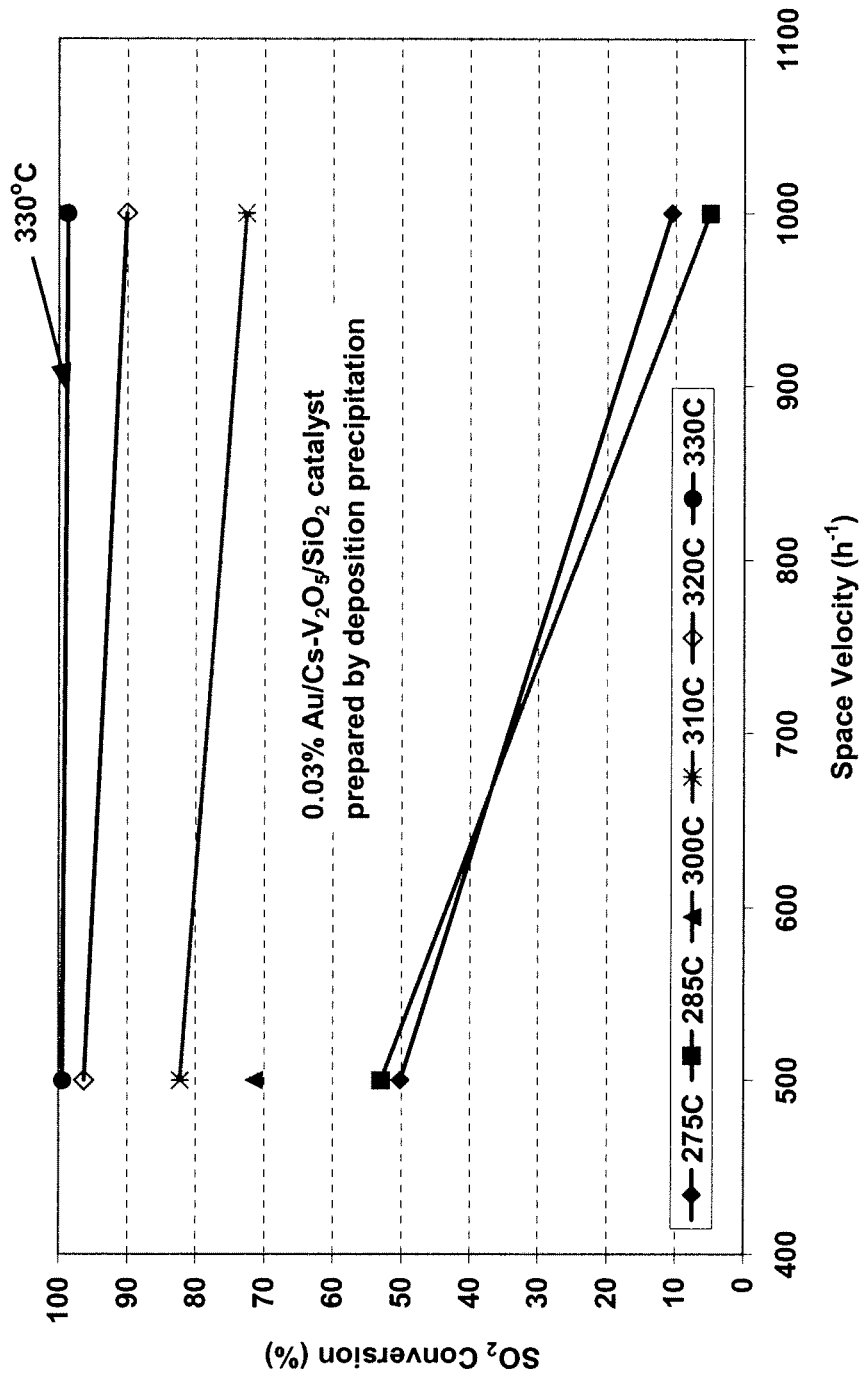
FIG. 7 is a graph showing the effect of the gas flow rate on $SO_2$ conversion in terms of the gas hourly space velocity (GHSV, $cm^3_{gas}/cm^3_{catalyst}/hr$) for the 0.03% Au/Cs—$V_2O_5$/$SiO_2$ catalyst of Example 1.

FIG. 7 shows the effect of the gas flow rate in terms of the gas hourly space velocity (GHSV, $cm^3_{gas}/cm^3_{catalyst}/hr$) on conversion employing 0.03% $Au/Cs-V_2O_5/SiO_2$ catalyst. At high temperatures, many catalysts begin to show behavior that indicates that the overall rate of conversion is at least somewhat limited by the rate of diffusion of reactants and products to and from the surface of the catalyst because the intrinsic surface catalytic rate of reaction increases exponentially and more rapidly than do diffusional rates as the temperature is increased. Therefore, the behavior of the catalyst shown in FIG. 7 is consistent with the Au-modified catalysts having high activity for $SO_2$ oxidation in that mass transfer limitations begin to be evident at temperatures as low as 310° C.

It was also found that the time required for the activity to stabilize when the catalyst was operated at temperatures below about 340° C., was somewhat long (~20 hours). This may be due to slow rates of formation of $(VO)_2O(SO_4)_2^{3-}$ and $(VO)_2O(SO_4)_4^{4-}$ ions that have been reported to be the active phase in vanadia based $SO_2$ oxidation catalysts or it may be due to the lower temperatures being closer to the melting points of the solids, which would also decrease the rate at which the catalyst comes to equilibrium with the $SO_2$, $SO_3$, and $O_2$ in the gas phase. It has been reported that the catalyst is in the molten state when active (Giakoumelou, I.; Parvulescu, V. and Boghosian, S., (2004) "Oxidation of Sulfur Dioxide over Supported Solid $V_2O_5/SiO_2$ and Supported Molten Salt $V_2O_5-Cs_2SO_4/SiO_2$ Catalysts: Molecular Structure and Reactivity" *J. Catal.*, 225, 337-349; Parvulescu, V. I.; Paun, C.; Parvulescu, V.; Alifanti, M.; Giakoumelou, I.; Boghosian, S.; Rasmussen, S. B.: Eriksen, K. M. and Fehrmann, R. (2004) "Vanadia-Silica and Vanadia-Cesium-Silica Catalysts for Oxidation of $SO_2$," *J. Catal.*, 225, 24-36).

Figure 8:
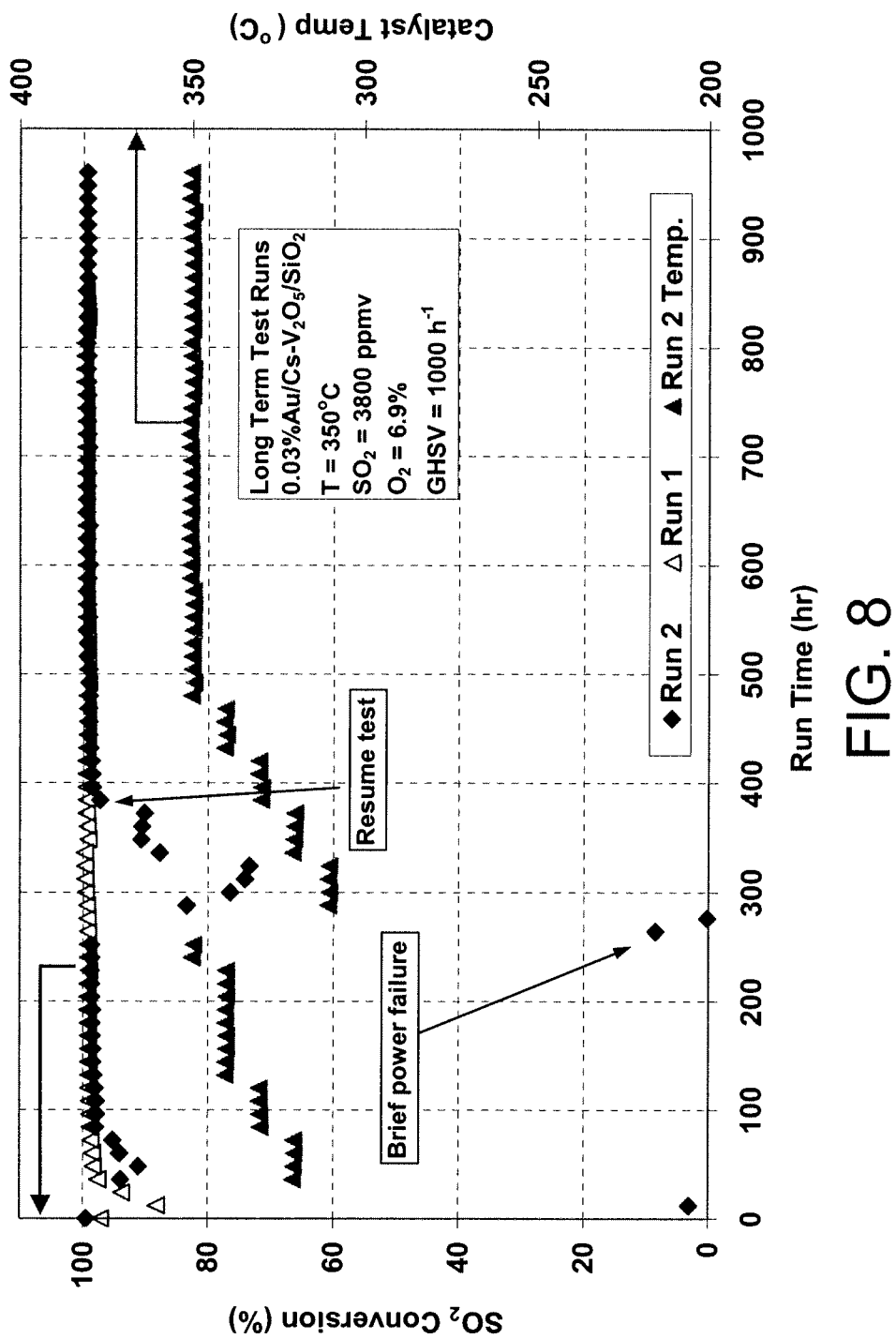
FIG. 8 is a graph showing the results of a 1000-hour lifetime test of the 0.03% Au/Cs—$V_2O_5$/$SiO_2$ catalyst (as in Example 1) operated under $4^{th}$ catalyst bed $SO_2$ converter conditions.
Figure 9:
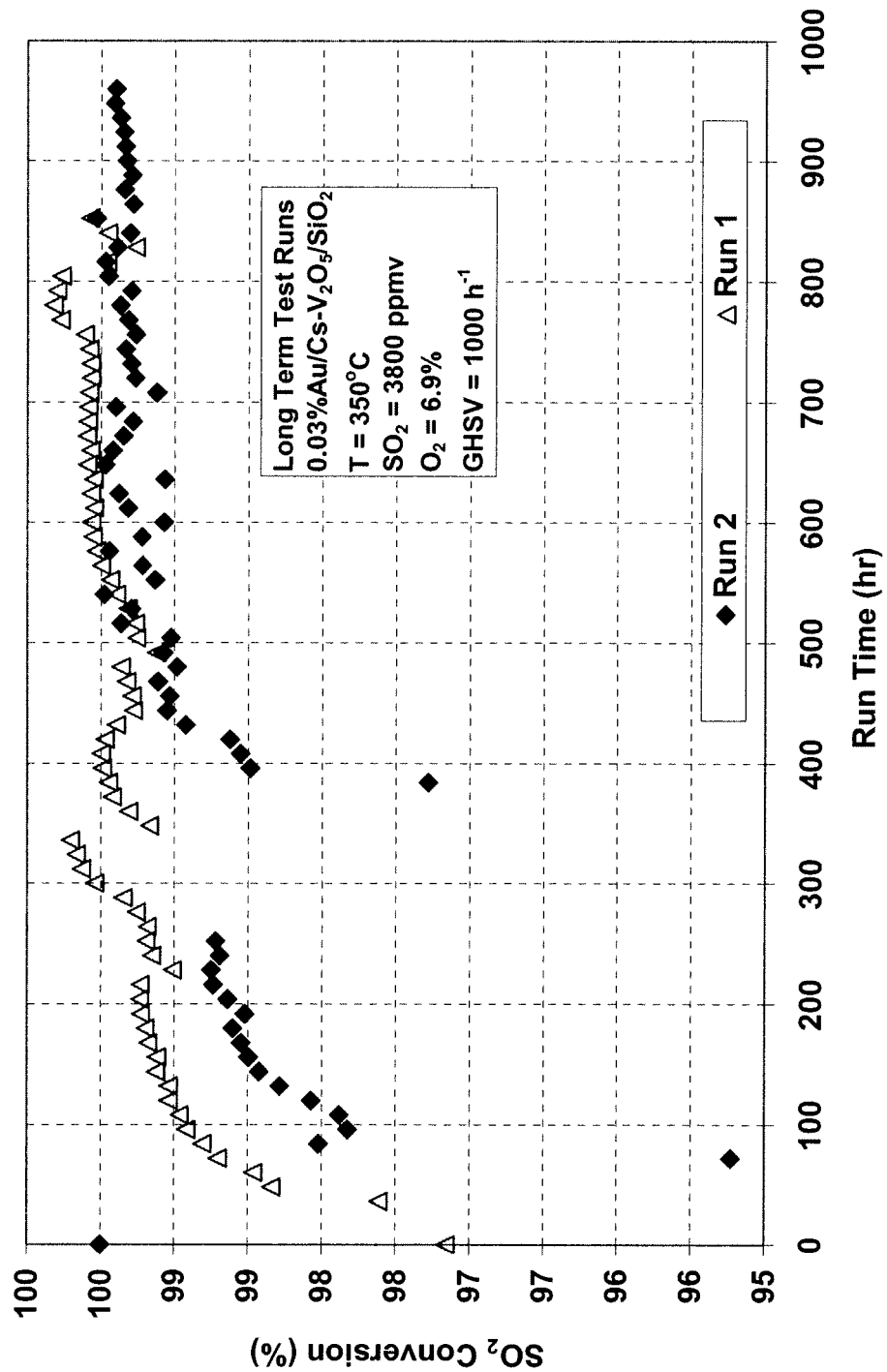
FIG. 9 is a graph showing an enlargement of the results of FIG. 8 for conversions of 95% and greater.

Based on the results obtained at 330° C. and GHSV=1000 $cm^3_{gas}/cm^3_{catalyst}/hr$ (typically recited as 1000 $h^{-1}$) a lifetime test was conducted on the 0.03% $Au/Cs-V_2O_5/SiO_2$ catalyst. FIG. 8 shows the results of a 1000-hour lifetime test of the 0.03% $Au/Cs-V_2O_5/SiO_2$ catalyst operated under $4^{th}$ bed $SO_2$ converter conditions (3800 ppm $SO_2$, 6.9% $O_2$ balance $N_2$, T=350° C., space velocity 1000 $h^{-1}$). FIG. 9 shows the results presented in FIG. 8 in the high conversion regime. There was a power failure in the laboratory at about 275 hours which tripped the safety shutdown of the apparatus, which manifests itself in a gap in the data around this time. The apparatus was back online and restarted about 24 hr later and the test resumed. No deactivation of the catalyst was observed during the remainder of the test.

Figure 10:
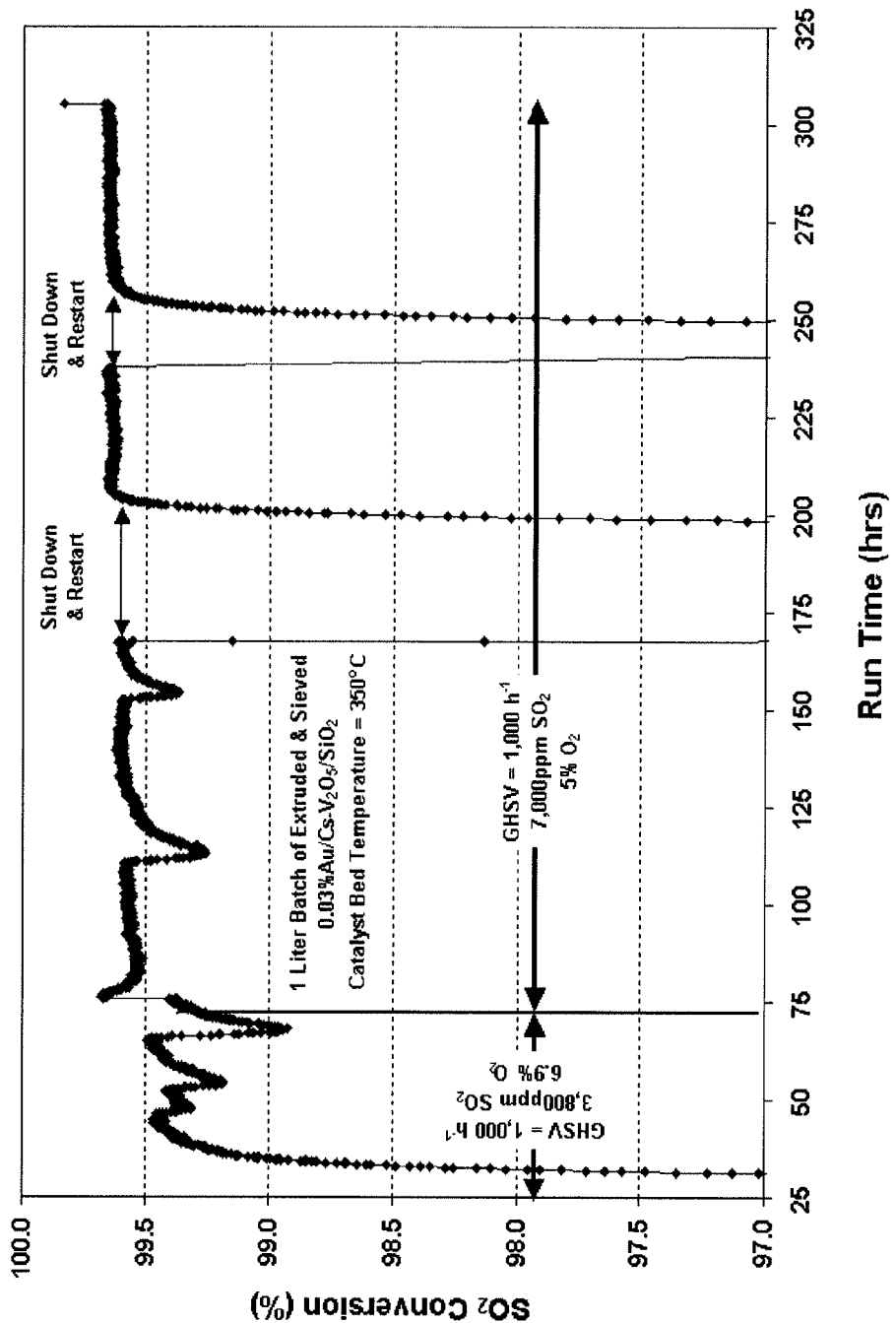
FIG. 10 is a graph showing the results of a 325-hour lifetime test of a sample of a batch of 0.03% Au/Cs—$V_2O_5$/$SiO_2$ catalyst where the catalyst synthesis had been scaled up to produce approximately 1 liter of catalyst (as in Example 1). The test was conducted under $4^{th}$ bed $SO_2$ converter conditions. Two $SO_2$ and $O_2$ concentrations were examined: 3800 ppm with 6.9% $O_2$ and 7000 ppm $SO_2$ with 5% $O_2$. The space velocity was 1000 $hr^{-1}$ for both tests.

FIG. 10 shows the results of a 325-hour lifetime test of the 0.03% $Au/Cs-V_2O_5/SiO_2$ catalyst operated under $4^{th}$ bed $SO_2$ converter conditions except that the $SO_2$ concentration was increased to 7000 ppm and the $O_2$ concentration was decreased to 5%. The higher $SO_2$ and lower $O_2$ conditions are more demanding than 3800 ppm $SO_2$ and 6.9% $O_2$ but are frequently encountered in the sulfuric acid manufacturing industry. As before, the balance of the feed gas was nitrogen. Under these conditions, the $SO_2$ conversion was approximately 99.6%. The temperature was maintained at 350° C. throughout the test and the space velocity was 1000 $hr^{-1}$. There was a brief shutdown due to instrument problems between about 170 and 200 hours. When the system was restarted, the $SO_2$ conversion returned to 99.6%. While the shutdown was unplanned, these results indicate that the catalyst quickly recovered from such a process upset without any degradation in its performance. No deactivation of the catalyst was observed over the duration of the test.

Figure 11:
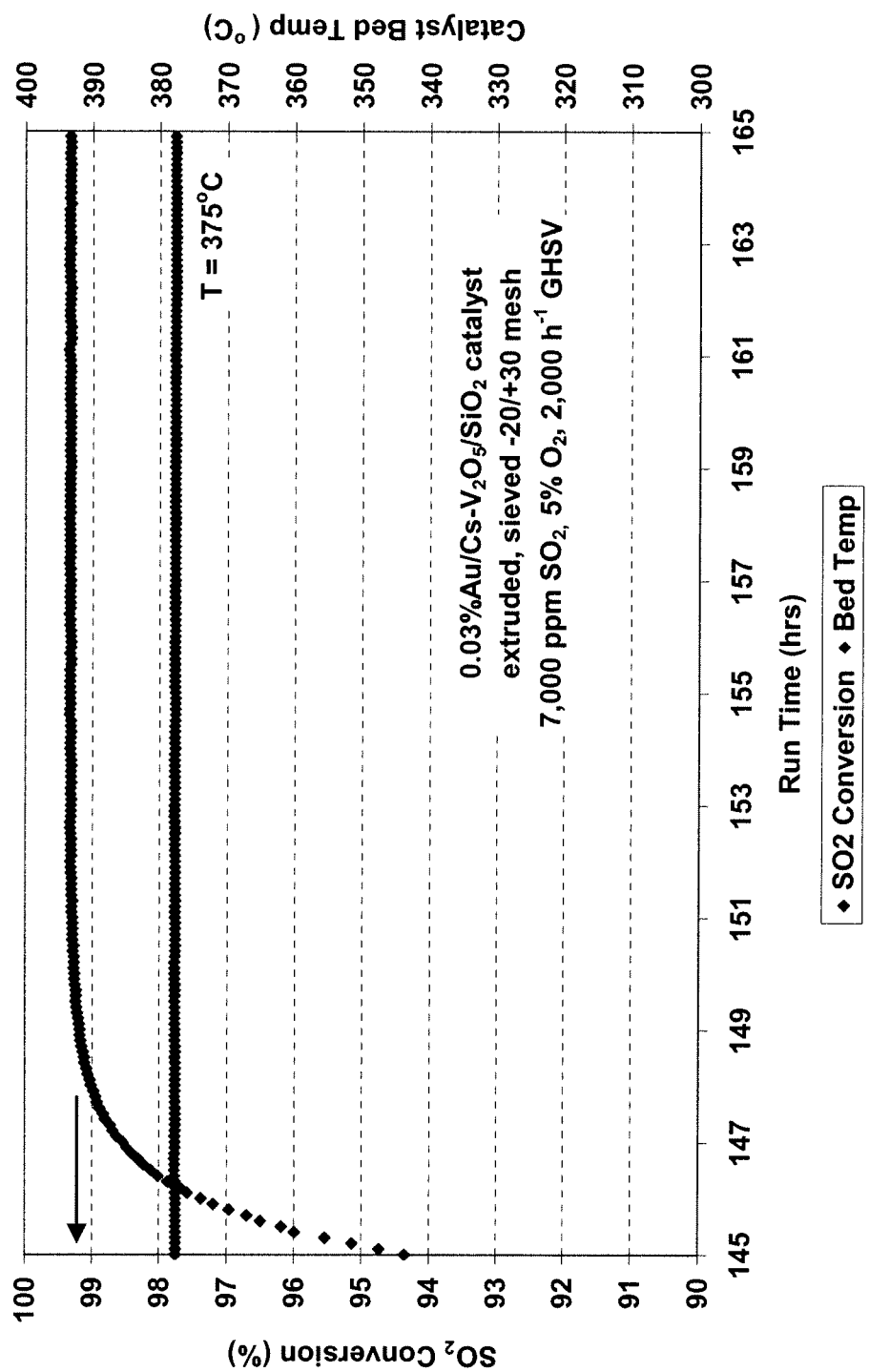
FIG. 11 is a graph showing the results of the first 20 hours of a lifetime test with the scaled-up batch of 0.03% Au/Cs—$V_2O_5$/$SiO_2$ catalyst at a temperature of 375° C., using 7000 ppm $SO_2$ and 5% $O_2$ in the feed at a space velocity of 2000 $h^{-1}$.
Figure 12:
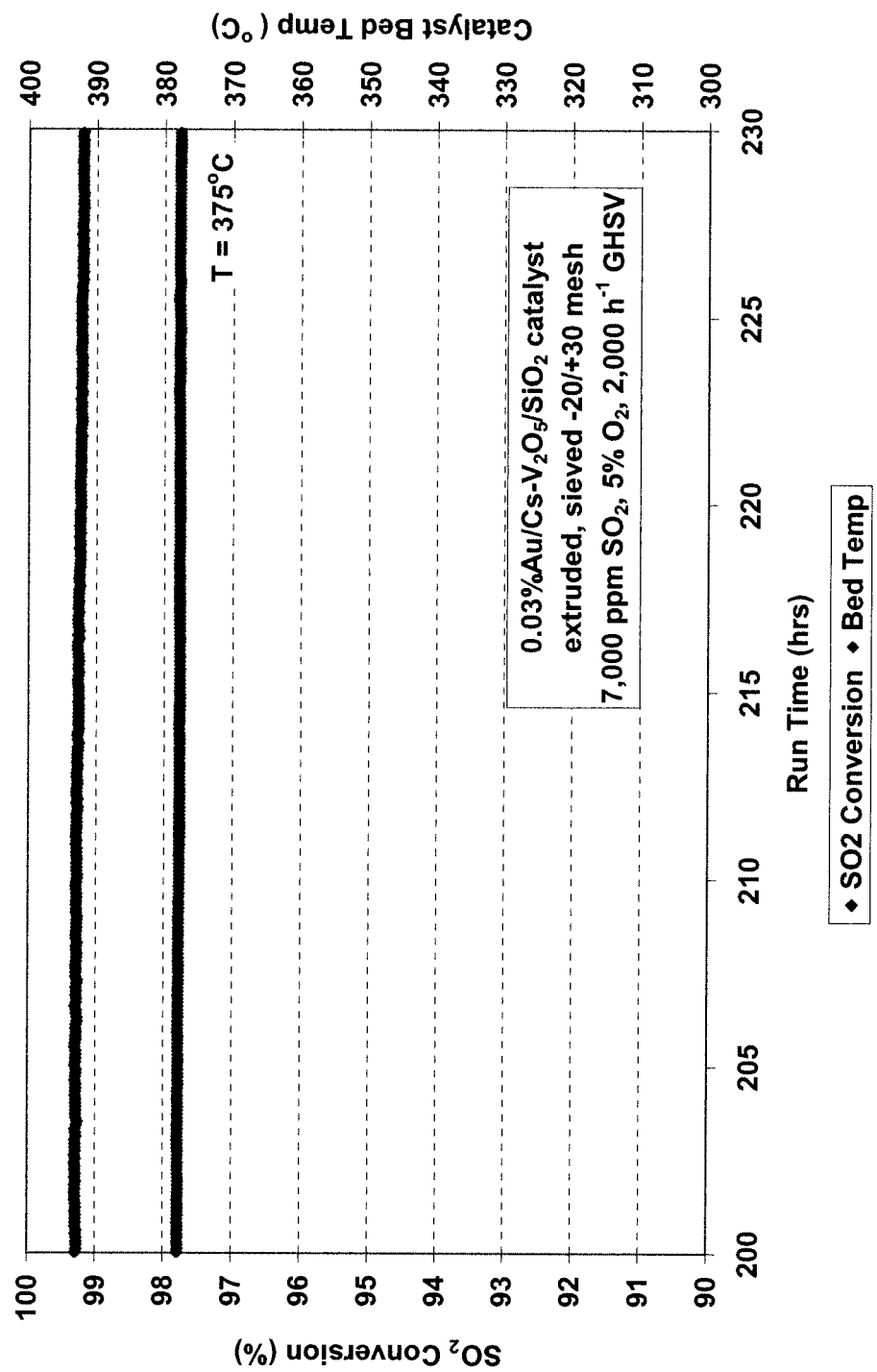
FIG. 12 is a graph that is a continuation of FIG. 11 between 200 and 230 hours.
Figure 13:
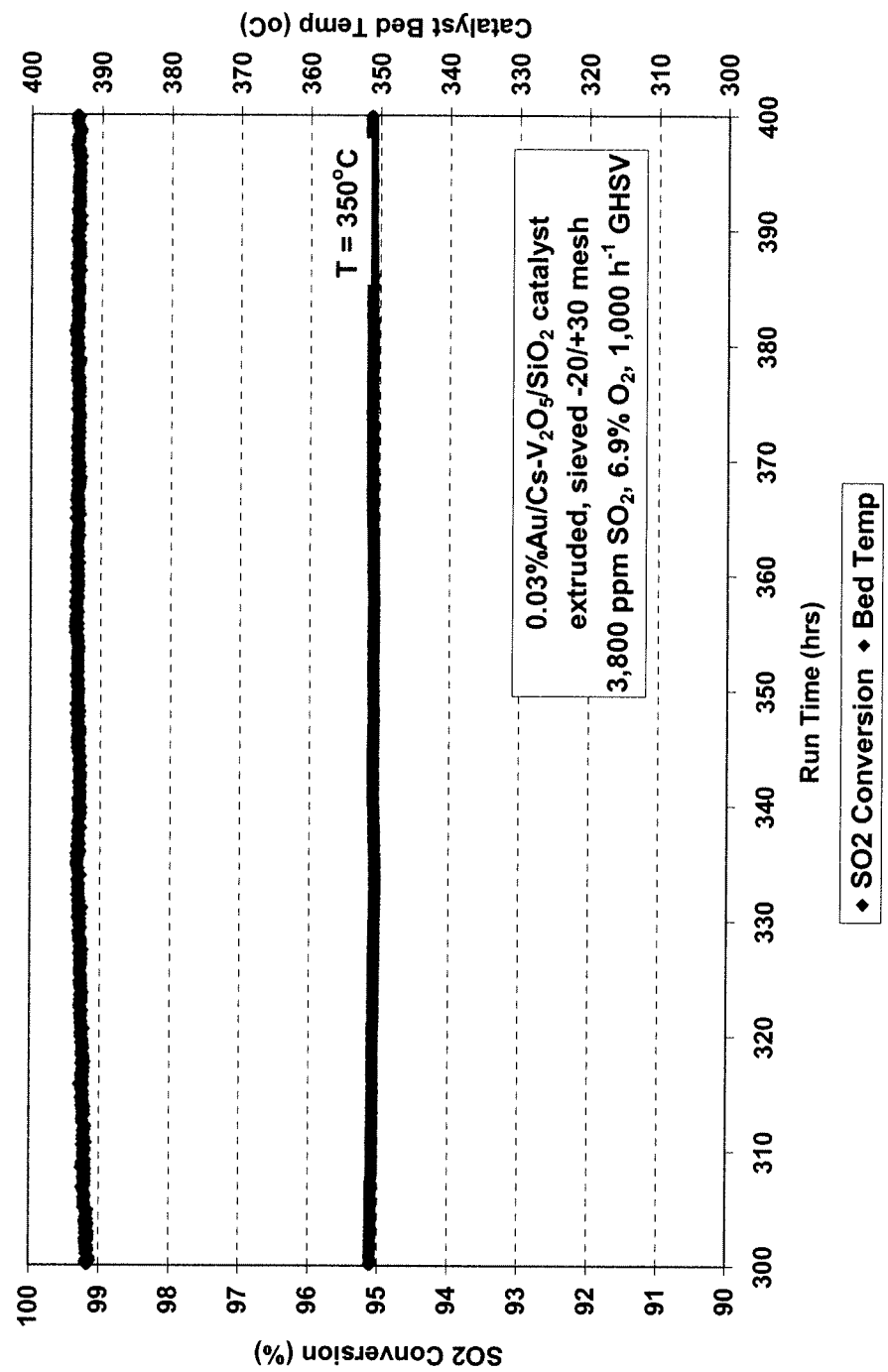
FIG. 13 is a graph showing a continuation of the test shown in FIG. 11 and FIG. 12 where the inlet gas concentration was changed to 3800 ppm $SO_2$, 6.9% $O_2$ and the space velocity was changed to 1000 $h^{-1}$.

FIG. 11 shows 20 hours of a test with TDA's 0.03% $Au/Cs-V_2O_5/SiO_2$ catalyst operated where the $SO_2$ concentration was 7000 ppm and the $O_2$ was to 5 vol %, but at double the space velocity (2000 hr$^{-1}$). As before, the balance gas in the feed was nitrogen. Under these conditions, the SO$_2$ conversion was approximately 99.8%. The temperature was maintained at 350° C. throughout the test. No deactivation was observed. FIG. 12 shows the continuation of the test for hours 200 through 230. FIG. 13 shows a continuation of the test of FIG. 12, but where the inlet concentrations were reduced to 3800 ppm SO$_2$ and 6.9% O$_2$ with the space velocity being reduced to 1000 h$^{-1}$. During all of these tests, the SO$_2$ conversion was greater than 99% and there was no evidence of catalyst deactivation or other degradation in the performance of the catalyst.

We claim:

1. A method for the oxidation of SO$_2$ which comprises the step of contacting a gas stream comprising SO$_2$ and O$_2$ at temperatures between 275° C. and 450° C. with a catalyst comprising vanadium, one or more alkali metals and gold.

2. The method of claim 1 wherein the catalyst is a supported catalyst comprising 0.005-5 wt % of gold and the atomic ratio of total alkali metal to vanadium ranges from 0.1 to 10.

3. The method of claim 1 wherein the catalyst is a supported catalyst comprising 0.01-1 wt % of gold, 5-15 wt % vanadium and 5-30 wt % alkali metal.

4. The method of claim 1 wherein the catalyst further comprises a second promoter metal selected from aluminum, magnesium, yttrium, lanthanum or mixtures thereof.

5. The method of claim 1 wherein the catalyst further comprises a second promoter metal (P2) selected from aluminum, magnesium, yttrium, lanthanum or mixtures thereof and wherein the atomic ratio of P2:V ranges from 0.1:1 to 1:1.

6. The method of claim 1 wherein the catalyst further comprises a second promoter metal (P2) selected from aluminum, magnesium, yttrium, lanthanum or mixtures thereof and wherein the second promoter is present in an amount ranging from 0.5 to 10 wt % in the catalyst.

7. The method of claim 1 wherein the catalyst is supported on silica, alumina, silica-alumina, titania, clay, zeolite, zirconia, ceria, cordierite, mullite, mullite-alumina, or mixtures thereof.

8. The method of claim 1 wherein the catalyst is supported on silica.

9. The method of claim 1 wherein the catalyst is activated by heating in SO$_2$ or SO$_3$ and O$_2$ or air at temperatures ranging from 300° C. to 600° C.

10. The method of claim 1 for oxidation of SO$_2$ which comprises multiple sequential oxidation steps one or more of which steps employs a vanadium SO$_2$ oxidation catalyst, wherein a fed gas comprising SO$_2$ and O$_2$ passes sequentially through the multiple oxidation steps to contact catalyst, wherein at least one of the oxidation steps employs an SO$_2$ oxidation catalyst comprising vanadium, an alkali metal and gold, wherein the oxidation step employing the catalyst comprising vanadium, an alkali metal and gold is conducted at temperatures between 275° C. to 400° C.

11. The method of claim 1 wherein the catalyst is extruded.

12. The method of claim 1 wherein the catalyst is prepared by forming a paste of support containing deposited gold with a vanadium compound, one or more compounds containing one or more alkali metals and if a second promoter is present, one or more compounds containing one or more second promoter metals.

13. A method for manufacture of sulfuric acid which comprises the steps of:
  (1) oxidizing SO$_2$ to SO$_3$, by a method of claim 1;
  (2) absorption of SO$_3$ into sulfuric acid and reaction with water to form sulfuric acid.

14. A supported catalyst for SO$_2$ oxidation which comprises 0.005-5 wt % of gold, 1-20 wt % vanadium and 1-40 wt % total alkali metal and a support which is sulfated.

15. The supported catalyst of claim 14 further comprising a second promoter metal selected from aluminum, magnesium, yttrium or lanthanum or mixtures thereof.

16. The supported catalyst of claim 14 wherein the catalyst is prepared by forming a paste of support containing deposited gold with a vanadium compound and one or more compounds containing one or more alkali metals.

17. The supported catalyst of claim 14 wherein the support is silica, alumina, silica-alumina, titania, clay, zeolite, zirconia, ceria, cordierite, mullite, mullite-alumina, or mixtures thereof.

18. A supported catalyst of claim 14 which comprises 0.01-0.075 wt % gold, 1-20 wt % vanadium and 1-40 wt % total alkali metal and a support.

19. The supported catalyst of claim 18 further comprising 0.5 to 10 wt % of a second promoter metal selected from aluminum, magnesium, yttrium, lanthanum or mixtures thereof.

20. The supported catalyst of claim 18 consisting of gold, support, vanadium and one or more alkali metals.

* * * * *